US008687545B2

(12) United States Patent
Damnjanovic et al.

(10) Patent No.: US 8,687,545 B2
(45) Date of Patent: Apr. 1, 2014

(54) ANCHOR CARRIER IN A MULTIPLE CARRIER WIRELESS COMMUNICATION SYSTEM

(75) Inventors: Jelena M. Damnjanovic, Del Mar, CA (US); Juan Montojo, San Diego, CA (US); Sandip Sarkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 815 days.

(21) Appl. No.: 12/536,637

(22) Filed: Aug. 6, 2009

(65) Prior Publication Data

US 2010/0034163 A1 Feb. 11, 2010

Related U.S. Application Data

(60) Provisional application No. 61/087,953, filed on Aug. 11, 2008, provisional application No. 61/120,232, filed on Dec. 5, 2008.

(51) Int. Cl.
*H04W 4/00* (2009.01)

(52) U.S. Cl.
USPC .......................................... 370/328; 370/329

(58) Field of Classification Search
USPC ................................................ 370/328, 329
See application file for complete search history.

(56) References Cited

U.S. PATENT DOCUMENTS

| 6,473,399 | B1 | 10/2002 | Johansson et al. |
| 7,630,725 | B2 | 12/2009 | Kwak et al. |
| 8,081,698 | B2 | 12/2011 | Xu et al. |
| 2006/0221894 | A1 | 10/2006 | Casaccia et al. |
| 2006/0274712 | A1* | 12/2006 | Malladi et al. ................. 370/345 |

(Continued)

FOREIGN PATENT DOCUMENTS

| EP | 1418776 A1 | 5/2004 |
| JP | 2008546255 A | 12/2008 |

(Continued)

OTHER PUBLICATIONS

Alcatel-Lucent et al: "Support for Semi-Static Inter cell Interference Coordination" 3GPP Draft; R1-081874_Semi-Static_Inter_Coord_or_Freus E_2, 3rd Generation Partnership Project (3GPP), Mobile Competence Centre; 650, Route des Lucioles; F-06921 Sophia-Antipolis Cedex; France, vol. RAN WGI, No. Kansas City, USA; May 14, 2008, XP050110242 [retrieved on May 14, 2008] the whole document.

(Continued)

*Primary Examiner* — Kenny Lin
(74) *Attorney, Agent, or Firm* — Paul Kuo

(57) ABSTRACT

Multiple downlink (DL) and uplink (UL) carriers can enhance wireless communication between nodes and user equipment (UE). Among the carriers, it is beneficial to have some special, by configuration designated carriers to provide synchronization, system information, paging, data and control for multi-carrier enabled UEs. Thereby, overhead system information can be reduced. For instance, synchronization and paging for a certain cell are not provided on all carriers. A carrier can provide backward compatibility for single carrier UEs for access, synchronization, broadcast, and new control region within the data region of the legacy terminals. Coordination between nodes for selecting anchor carriers that mitigate interference and for transmit power control for non-anchor carriers provide further network performance advantages.

80 Claims, 14 Drawing Sheets

(56) References Cited

U.S. PATENT DOCUMENTS

| | | | | |
|---|---|---|---|---|
| 2006/0280142 | A1* | 12/2006 | Damnjanovic et al. | 370/329 |
| 2007/0091817 | A1 | 4/2007 | Yoon et al. | |
| 2010/0040004 | A1* | 2/2010 | Damnjanovic et al. | 370/329 |
| 2010/0172290 | A1* | 7/2010 | Nam et al. | 370/328 |
| 2010/0227569 | A1* | 9/2010 | Bala et al. | 455/73 |
| 2010/0232373 | A1* | 9/2010 | Nory et al. | 370/329 |
| 2010/0322158 | A1* | 12/2010 | Lee et al. | 370/329 |

FOREIGN PATENT DOCUMENTS

| | | | |
|---|---|---|---|
| JP | 2009509392 A | 3/2009 | |
| JP | 2009542164 A | 11/2009 | |
| RU | 2235432 C2 | 8/2004 | |
| WO | 2006031834 A2 | 3/2006 | |
| WO | 2006125149 A2 | 11/2006 | |
| WO | 2007035045 A2 | 3/2007 | |
| WO | 2008003087 A2 | 1/2008 | |

OTHER PUBLICATIONS

CATT: "Consideration on Technologies for LTE-Advanced" 3GPP Draft; R1-082569, 3rd Generation Partnership Project (3GPP), Mobile Competence Centre; 650, Route des Lucioles; F-06921 Sophia-Antipolis Cedex; France, vol. RAN WGI, No. Warsaw, Poland; Jun. 25, 2008, XP050110829 p. 1, paragraph 2.1.

Ericsson: "A discussion on some technology components for LTE-Advanced", 3GPP Draft, R1-082024 {LTE-Advanced Technology Components}, 3rd Generation Partnership Project (3GPP), Mobile Competence Centre, 650, Route des Lucioles, F-06921 Sophia-Antipolis Cedex, France, vol. RAN WG1, No. Kansas City, USA, May 14, 2008, XP050110365, [retrieved on May 14, 2008].

Ericsson, "Carrier aggregation in LTE-Advanced", 3GPP Draft, R1-082468, 3rd Generation Partnership Project (3GPP), Mobile Competence Centre, 650, Route des Lucioles, F-06921 Sophia-Antipolis Cedex, France, vol. RAN WGI, No. Warsaw, Poland, Jun. 30, 2008, XP050110739.

Ericsson: "Considerations on Dual-Cell HSDPA Operation" 3GPP Draft; R1-081545, 3rd Generation Partnership Project (3GPP), Mobile Competence Centre; 650, Route des Lucioles; F-06921 Sophia-Antipolis Cedex; France, vol. RAN WG1, No. Shenzhen, China; Mar. 27, 2008, XP050109958 [retrieved on Mar. 27, 2008] the whole document.

Ericsson: "Options for Inter-cell Interference Coordination (ICIC)" 3GPP Draft; R3-061199, 3rd Generation Partnership Project (3GPP), Mobile Competence Centre; 650, Route des Lucioles; F-06921 Sophia-Antipolis Cedex; France, vol. RAN WG3, No. Tallinn; Aug. 23, 2006, XP050160110 [retrieved on Au. 23, 2006] the whole document.

"European Search Report—EP12162691—Search Authority—Munich—Jun. 19, 2012.".

Huawei: "Process of the Inter-cell RRM" 3GPP Draft; R3-060429, 3rd Generation Partnership Project (3GPP), Mobile Competence Centre; 650, Route des Lucioles; F-06921 Sophia-Antipolis Cedex; France, vol. RAN WG3, No. Sophia Antipolis, France; Mar. 30, 2006, XP050159357 [retrieved on Mar. 30, 2006] the whole document.

International Search Report and Written Opinion—PCT/US2009/053318, International Search Authority—European Patent Office—Mar. 11, 2010.

NTT DoCoMo: Proposals for LTE-Advanced Technologies 3GPP TSG-RAN WG1 #53BIS, R1-082575, [Online] Jun. 25, 2008, pp. 1-36, XP002558501 Retrieved from the Internet: URL:http://www3gpporg/ftp/tsg_ran/WGI_RL 1/TSGR1 53b/Docs/> [retrieved on Dec. 1, 2009] pp. 4-15.

Philips et al: Discussion of Technologies for LTE-Advanced 3GPP Draft; R1-082533, 3rd Generation Partnership Project (3GPP), Mobile Competence Centre; 650, Route des Lucioles; F-06921 Sophia-Antipolis Cedex; France, vol. RAN WG1, No. Warsaw, Poland; Jun. 26, 2008, XP050110798 p. 1, paragraph 2.

Qualcomm Europe: Carrier Aggregation in Heterogeneous Networks 3GPP Draft; R1090357, 3rd Generation Partnership Project (3GPP), Mobile Competence Centre; 650, Route des Lucioles; F-06921 Sophia-Antipolis Cedex; France, No. Ljubljana; Jan. 8, 2009, XP050318263 the whole document.

Qualcomm Europe: Finalizing DL ICIC for Rel. 8 3GPP Draft; R1-081974, 3rd Generation Partnership Project (3GPP), Mobile Competence Centre; 650, Route des Lucioles; F-06921 Sophia-Antipolis Cedex; France, vol. RAN WG1, No. Kansas City, USA; May 14, 2008, XP050110324 [retrieved on May 14, 2008] the whole document.

Qualcomm Europe: "Multicarrier Control for LTE-Advanced", 3GPP Draft; R1-090359, 3rd Generation Partnership Project (3GPP), Mobile Competence Centre; 650, Route des Lucioles; F-06921 Sophia-Antipolis Cedex; France, No. Ljubljana; Jan. 8, 2009, XP050318265, [retrieved on Jan. 8, 2009].

Qualcomm Europe: Notion of Anchor Carrier in LTE-A 3GPP Draft; R1-090356, 3rd Generation Partnership Project (36PP), Mobile Competence Centre; 650, Route des Lucioles; F-06921 Sophia-Antipolis Cedex; France, No. Ljubljana; Jan. 8, 2009, XP050318262 the whole document.

Taiwan Search Report—TW098126963—TIPO Dec. 10, 2012.

* cited by examiner

ANCHOR CARRIER IN A MULTIPLE CARRIER WIRELESS COMMUNICATION SYSTEM

CLAIM OF PRIORITY UNDER 35 U.S.C. §119

The present Application for Patent claims priority to Provisional Application No. 61/087,953 entitled "SYSTEM INFORMATION COMMUNICATION IN A MULTIPLE CARRIER WIRELESS COMMUNICATION SYSTEM" filed Aug. 11, 2008, and assigned to the assignee hereof and hereby expressly incorporated by reference herein.

The present Application for Patent claims priority to Provisional Application No. 61/120,232 entitled "ANCHOR CARRIER CONCEPT IN LTE-ADVANCED" filed Dec. 5, 2008, and assigned to the assignee hereof and hereby expressly incorporated by reference herein.

BACKGROUND

1. Field

The present disclosure relates generally to communication, and more specifically to techniques for multicarrier communication and for coordinating carrier transmission between nodes.

2. Background

The 3rd Generation Partnership Project (3GPP) Long Term Evolution (LTE) represents a major advance in cellular technology and is the next step forward in cellular 3G services as a natural evolution of Global system for mobile communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support well into the next decade. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an enhanced base station (eNodeB) and mobile user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier—Frequency Division Multiple Access (SC-FDMA) on the uplink (UL). OFDMA allows data to be directed to or from multiple users on a subcarrier-by-subcarrier basis for a specified number of symbol periods.

Recently, LTE Advanced is an evolving mobile communication standard for providing 4G services. Being defined as 3G technology, LTE does not meet the requirements for 4G also called IMT Advanced as defined by the International Telecommunication Union such as peak data rates up to 1 Gbit/s. Besides the peak data rate, LTE Advanced also targets faster switching between power states and improved performance at the cell edge.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for multiple carrier communication by employing a processor executing computer executable instructions stored on a computer readable storage medium to implement the following acts: An anchor carrier is received. A grant is detected carried on the anchor carrier assigning resources on another carrier. The assigned resources are utilized on the another carrier in accordance with the detected grant.

In another aspect, a computer program product is provided for multiple carrier communication. At least one computer readable storage medium stores computer executable instructions that when executed by at least one processor implement components: A first set of instructions causes a computer to receive an anchor carrier. A second set of instructions causes the computer to detect a grant carried on the anchor carrier assigning resources on another carrier. A third set of instructions causes the computer to utilize the assigned resources on the another carrier in accordance with the detected grant.

In an additional aspect, an apparatus is provided for multiple carrier communication. At least one computer readable storage medium stores computer executable instructions that when executed by the at least one processor implement components: Means are provided for receiving an anchor carrier. Means are provided for detecting a grant carried on the anchor carrier assigning resources on another carrier. Means are provided for utilizing the assigned resources on the another carrier in accordance with the detected grant.

In a further aspect, an apparatus is provided for multiple carrier communication by comprising a transmitter. A receiver receives an anchor carrier. A computing platform detects a grant carried on the anchor carrier assigning resources on another carrier and for utilizes the assigned resources via the transmitter or receiver on the another carrier in accordance with the detected grant.

In yet one aspect, a method is provided for multiple carrier communication by employing a processor executing computer executable instructions stored on a computer readable storage medium to implement the following acts: Resources are scheduled for an anchor carrier and another carrier. A grant is transmitted on the anchor carrier assigning resources on the another carrier. Communication is performed with a recipient that utilizes the assigned resources on the another carrier in accordance with the grant.

In yet another aspect, a computer program product is provided for multiple carrier communication. At least one computer readable storage medium stores computer executable instructions that when executed by at least one processor implement components: A first set of instructions causes a computer to schedule resources for an anchor carrier and another carrier. A second set of instructions causes the computer to transmit a grant on the anchor carrier assigning resources on the another carrier. A third set of instructions causes the computer to communicate with a recipient that utilizes the assigned resources on the another carrier in accordance with the grant.

In yet an additional aspect, an apparatus is provided for multiple carrier communication. At least one computer readable storage medium stores computer executable instructions that when executed by the at least one processor implement components: Means are provided for scheduling resources for an anchor carrier and another carrier. Means are provided for transmitting a grant on the anchor carrier assigning resources on the another carrier. Means are provided for communicating with a recipient that utilizes the assigned resources on the another carrier in accordance with the grant.

In yet a further aspect, an apparatus is provided for multiple carrier communication by comprising receiver. A scheduler schedules resources for an anchor carrier and another carrier. A transmitter transmits a grant on the anchor carrier assigning resources on the another carrier. A receiver communicates with a recipient that utilizes the assigned resources on the another carrier in accordance with the grant.

In another additional aspect, a method is provided for coordinating carrier transmission between nodes by employing a processor executing computer executable instructions stored on a computer readable storage medium to implement the following acts: A first carrier is transmitted to provide wireless service to a first user equipment (UE) while a neighboring cell transmits a second carrier to provide wireless service to a second UE. Coordinating is performed with the neighboring cell so that a first and second UE receive respective carrier without jamming interference from the other carrier.

In yet another additional aspect, a computer program product is provided for coordinating carrier transmission between nodes. At least one computer readable storage medium stores computer executable instructions that when executed by at least one processor implement components: A first set of instructions causes a computer to transmit a first carrier to provide wireless service to a first user equipment (UE) while a neighboring cell transmits a second carrier to provide wireless service to a second UE. A second set of instructions causes the computer to coordinate with the neighboring cell so that the first and second UE receive respective carrier without jamming interference from the other carrier.

In yet another further aspect, an apparatus is provided for coordinating carrier transmission between nodes. At least one computer readable storage medium stores computer executable instructions that when executed by the at least one processor implement components: Means are provided for transmitting a first carrier to provide wireless service to a first user equipment (UE) while a neighboring cell transmits a second carrier to provide wireless service to a second UE. Means are provided for coordinating with the neighboring cell so that the first and second UE receive respective carrier without jamming interference from the other carrier.

In yet a further additional aspect, an apparatus is provided for coordinating carrier transmission between nodes comprising a receiver. A transmitter transmits a first carrier to provide wireless service to a first user equipment (UE) while a neighboring cell transmits a second carrier to provide wireless service to a second UE. A scheduler coordinates with the neighboring cell so that the first and second UE receive respective carrier without jamming interference from the other carrier.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

LTE-Advanced has provisions for multiple downlink (DL) and uplink (UL) carriers. Among the carriers, it is beneficial to have some special, by configuration designated carriers to provide synchronization, system information, paging, data and control for Rel-8 and/or LTE-A UEs. Thereby, overhead system information can be reduced. For instance, synchronization and paging for a certain cell are not provided on all carriers. In one aspect, an anchor carrier can serve as the legacy carrier for LTE terminals and provides support for new (Release 9/10) terminals for access, synchronization, broadcast, and new control region within the data region of the legacy terminals. Coordination between nodes for selecting anchor carriers that mitigate interference and for transmit power control for non-anchor carriers provide further network performance advantages.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
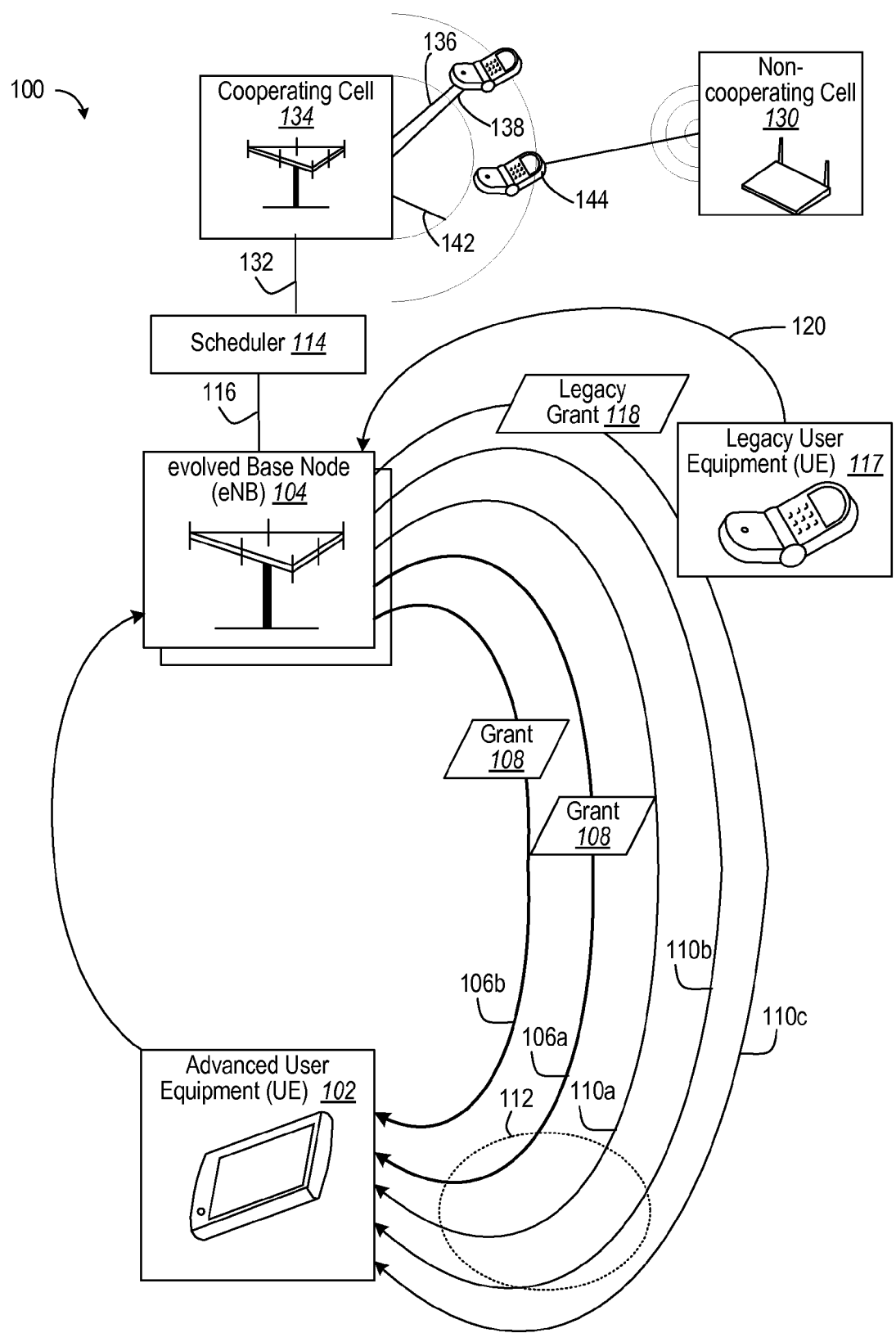
FIG. 1 depicts a block diagram of a wireless communication system in which multicarrier communication is coordinated and carrier transmission between nodes is performed to reduce interference.

With reference to FIG. 1, a communication system 100 enables user equipment (UE) 102 with advanced capabilities to acquire a subset of downlink (DL) carriers from a multiple carrier base station, depicted as an evolved Base Node (eNB) 104. In particular, anchor carriers 106a, 106b are capable of scheduling downlink (DL) and uplink (UL) grants 108 for the UE 102 for other carriers 110a-110c. In another aspect, the scheduling can encompass resources of one or more anchor carriers 106a, 106b.

It should be appreciated that a cluster of access points (APs) could be within a single node. For example, a cluster of APs could jointly serve UEs without orthogonal resources. Alternatively, a single AP can operate a plurality of nodes.

In one aspect, a multicarrier design for LTE-Advanced (e.g., Rel-9/Rel-10) supports an anchor carrier without restrictions on bandwidth dedication for each link. For example, the bandwidth dedication can be symmetrically the same for UL and DL. As another example, the bandwidth dedication can be asymmetric for the UL and DL as being dependent on the traffic demands for UL and DL. Similarly, carrier bandwidth can be uniform across carriers or different across carriers. UL/DL carrier pairing can be one to one with the same number of UL and DL carriers. Alternatively, UL/DL carrier pairing can be many to one or one to many with a different number of UL than DL carriers. UL carriers can be OFDMA (Orthogonal Frequency-Division Multiple Access) that provides flexibility for multiple carrier assignments to a UE. Alternatively, a SC-FDMA (Synchronous Code Division Multiple Access) based signal can be used for an anchor carrier. As another alternative, an OFDMA/SC-FDMA hybrid can support a layered environment with switching between those two.

As an overview of anchor carrier implementation, it would be advantageous and practical for a communication system 100 with collocated anchor and non-anchor carriers 106a-106b, 110a-110c. There may be several anchor carriers for different groups of carriers that carry system information, control, and perhaps data if sufficient resources. For example, an anchor carrier 106a can support a group 112 that is a subset of carriers 106a, 110a, 110b. Alternatively or in addition, an anchor carrier 106b can support a group of carriers 106a, 106b, 110a-110c that overlaps carriers 106a, 110a, 110b supported by another carrier 106b.

The transmission of downlink carriers 106a, 106b, 110a-110c can be performed from a plurality of antennas (not shown). Alternatively or in addition, a plurality of eNB 104 can cooperate in communicating with the UE 102. To that end, a scheduler 114 performs resource allocation coordinated over a backhaul network 116 (e.g., wired, wireless). Thereby, benefits can be realized such overhead reduction for eNB 104 that consolidate signaling on a subset of carriers, reducing required searching for control across multiple carriers by UE 102, and mapping of the Hybrid Automatic Repeat request (HARQ) feedback on an uplink.

Advantageously, some carriers 106b, 110c can provide support for backward compatible for legacy UEs 117 that are not capable of multiple carrier receiving by providing legacy DL and UL resource grants 118 on one carrier 110c and its corresponding uplink 120. This provides backward compatibility for an anchor carrier. In particular, primary synchronization signal (PSS) and secondary synchronization signal (SSS) can be provided on carriers for synchronization, MIB (Master Information Block) on PBCH (Physical Broadcast Channel) for system bandwidth, PHICH (Physical Hybrid ARQ Indicator Channel) configuration, and system frame number corresponding to the anchor carrier only. SIBs (System Information Block) can be provided on DL-SCH (Downlink Shared Channel). In one aspect, legacy UEs 118 can be redirected from the anchor to another DL carrier by an intra-cell inter-frequency handover message.

Further consider a special case where a group of carriers for which it is defined as an anchor is empty, it can becomes a regular (non-anchor) carrier wherein broadcast, control, and data is applicable only to that carrier.

With regard to conveying system information, in an illustrative aspect, additional SIBs on an anchor carrier can provide multicarrier information, such as carrier locations, carrier bandwidths, carrier designation (UL/DL), carrier pairing, other anchor (UL and DL) carriers, and new control regions. In one aspect, additional SIBs can be transparent to the legacy UEs.

Non-anchor carriers in an exemplary aspect may not need to provide backward compatibility that is instead provided by the anchor carrier used by a new class of UEs.

With regard to DL grant, legacy UE thus receives a DL grant on the same anchor carrier that assigns resources on the same carrier. A UE with advanced capabilities (e.g., Rel-9/10) can receive a DL grant from an anchor carrier for DL resources on another DL carrier. In one aspect, the anchor carrier supports an assigned group of carriers. In another aspect, each anchor carrier can transmit a DL grant on multiple carriers including other anchor carrier or non-anchor carriers also assigned by another DL anchor carrier. In a further aspect, a DL non-anchor carrier can transmit DL grants that assign DL resources for that carrier only similarly to that performed for legacy UEs.

With regard to UL Grant, a legacy UE receives an UL grant on the anchor carrier that assigns resources on the UL carrier paired with the anchor carrier. An advanced UE (e.g., Rel-9/10) receives an UL grant on the anchor carrier that assigns UL resources on the other UL carriers for which it is defined as an anchor carrier (i.e., grouped or not grouped). In one aspect, UL carriers are paired with the DL carriers for which it is defined as an anchor carrier. In one aspect, UL grants on a DL carrier that is not an anchor carrier can assign only the resources for the UL carrier paired with it similar to that used for legacy UEs.

With regard to HARQ, in one aspect the eNB transmits UL HARQ feedback on a DL carrier that sent the UL grant. For multi-carrier grants, in another aspect the HARQ feedbacks for different UL carriers can be sent on the anchor carrier where the multi-carrier grant was sent. Resource mapping can adjust such that ACKs (acknowledgements) for different carriers are distinguished. DL HARQ feedback on UL can come on the UL carrier paired with the DL carrier where the grant was sent. For multicarrier grants, the HARQ feedbacks for different DL carriers can be sent on the UL paired with the anchor carrier, where the grant was sent. Resource mapping is such that ACKs for different carriers are distinguished. In one aspect, a legacy UL is implicitly achieved by using one anchor carrier to convey all DL assignments, such as being based on the first CCE (Control Channel Element) on DCI (Downlink Control Information) on the PDCCH (Physical Downlink Control Channel).

Regarding CQI (Channel Quality Indicator) Feedback on UL, in one aspect CQI feedback for multiple DL carriers can be conveyed on the anchor UL carrier. In an illustrative implementation, an anchor UL carrier is defined in additional SIBs (system information blocks) or by RRC (Radio Resource Control) signaling (per UE). In an exemplary aspect, UL carrier is paired with the DL anchor carrier that enables implicit signaling.

The scheduler 114 can advantageously unilaterally assign resources on a carrier that is not subject to interference from a non-cooperating cell 130. The scheduler 116 can coordinate by backhaul communication 132 with a cooperating cell 134 to use different anchor carriers 136, 138. The scheduler 116 can coordinate transmit power adjustment on non-anchor carriers 140, 142 so that they can be used for single carrier service or to avoid interfering with a UE 144 serviced by the cooperating cell 134.

Figure 2:
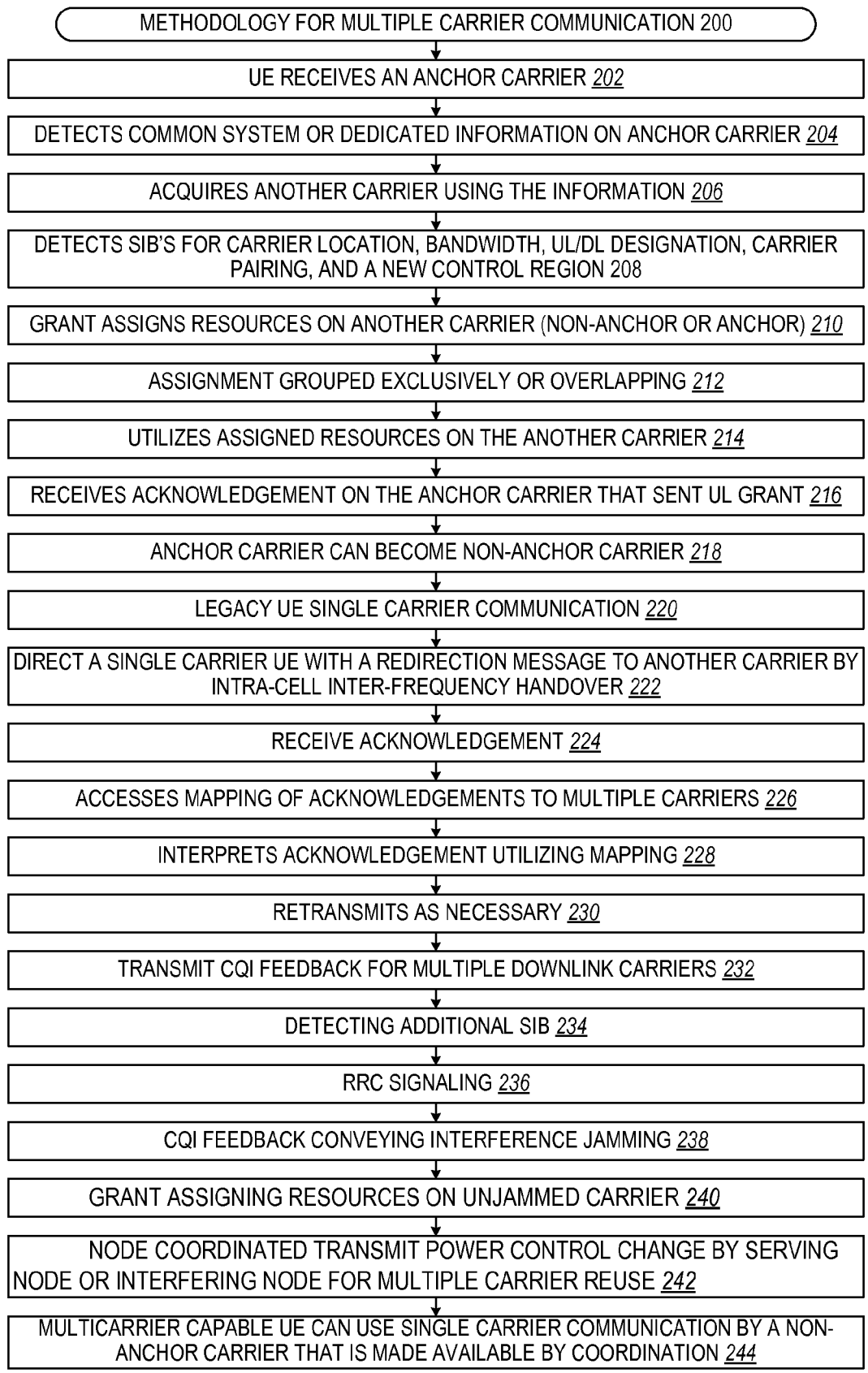
FIG. 2 depicts a flow diagram for a methodology or sequence of operations for facilitating multiple carriers in a wireless communication system.

In FIG. 2, a methodology or sequence of operations 200 is provided for multiple carrier communication. In block 202, UE receives an anchor carrier. The UE detects common system information or dedicated information on the anchor carrier (block 204). The UE acquires the another carrier by using the common system information or dedicated information (block 206). In one aspect, the UE detects system information blocks on the anchor carrier for utilizing the another carrier comprising carrier location, carrier bandwidth, carrier uplink or downlink designation, carrier pairing, and a new control region (block 208). In another aspect, the UE detects a grant carried on the anchor carrier that assigns resources on another carrier such as a non-anchor (block 210). The assignment can be grouped exclusively or overlapping where certain anchor carriers can both assign resources with regard to a particular carrier (block 212). UE utilizes the assigned resources on the another carrier in accordance with the detected grant (block 214). UE receives acknowledgement of receipt by the node of the uplink carrier transmission on the anchor carrier that sent the uplink grant (block 216).

In some instances, UE can receive a non-anchor carrier that was previously received as the anchor carrier subsequent to the another carrier no longer requiring assignment of resources (block 218).

In another instance, a legacy UE can initiate single carrier communication by synchronizing to one of the carriers (anchor or non-anchor). For example, the UE can perform synchronizing to primary and secondary synchronization signals of the anchor carrier, detecting master information block on a Physical Broadcast Channel informing system bandwidth, Physical Hybrid Automatic Repeat Request Indicator Channel (PHICH) configuration, system frame number; and detecting system information blocks on downlink shared channel (DL-SCH) for resources on the anchor carrier (block 220). In lieu of multicarrier operation, the node can direct a single carrier UE with a redirection message to another carrier by intra-cell inter-frequency handover (block 222).

Multicarrier operation can advantageously address feedback. For instance, UE can receive acknowledgement of receipt of each of the uplink carrier transmissions on the anchor carrier that sent the uplink grant (block 224). Insofar as UE may have transmitted on multiple uplinks, UE accesses a mapping of acknowledgements to multiple carriers (block 226) and interprets the acknowledgement for each uplink carrier transmission utilizing the mapping (block 228). UE retransmits the uplink carrier transmission determined to have been unsuccessfully transmitted (block 230).

UE can further transmit Channel Quality Indicator (CQI) feedback for multiple downlink carriers on an uplink anchor carrier (block 232), such as by detecting an additional system information block on the anchor carrier (block 234) or by detecting resource radio control (RRC) signaling (block 236).

When UE reports CQI feedback conveying interference jamming receipt of a carrier (block 238), UE receives a grant assigning resources on a carrier not jammed by the interference (block 240). Freeing up of an unjammed carrier can be a result of the node coordinating a transmit power control change by either a serving node or an interfering node for multiple carrier reuse (block 242). In one aspect, a multicarrier capable UE can use single carrier communication by a non-anchor carrier that is made available by coordination (block 244).

Figure 3:
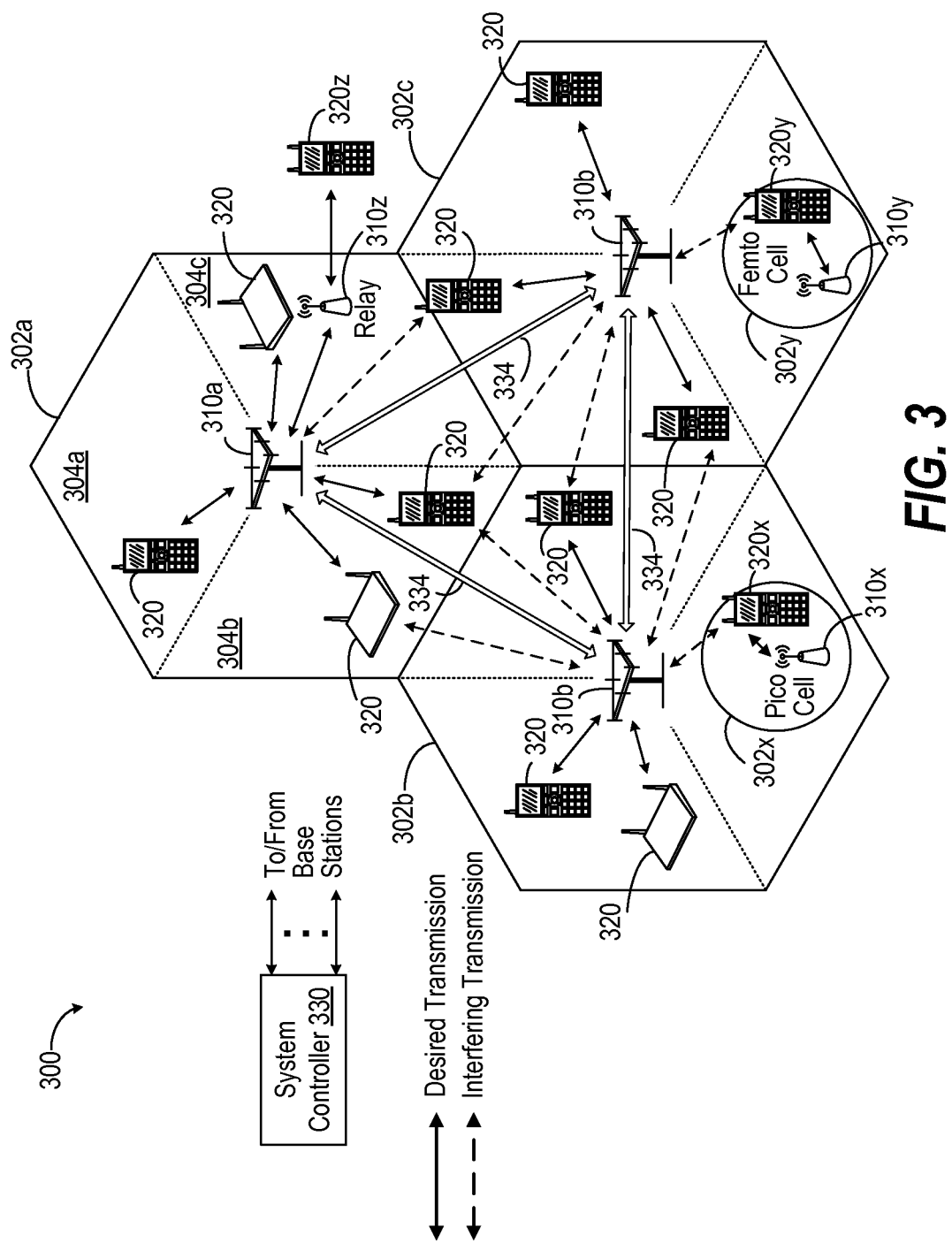
FIG. 3 depicts a block diagram of base stations serving and interfering with a population of terminals.

In the example shown in FIG. 3, base stations 310a, 310b and 310c may be macro base stations for macro cells 302a, 302b and 302c, respectively. Base station 310x may be a pico base station for a pico cell 302x communicating with terminal 320x. Base station 310y may be a femto base station for a femto cell 302y communicating with terminal 320y. Although not shown in FIG. 3 for simplicity, the macro cells may overlap at the edges. The pico and femto cells may be located within the macro cells (as shown in FIG. 3) or may overlap with macro cells and/or other cells.

Wireless network 300 may also include relay stations, e.g., a relay station 310z that communicates with terminal 320z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 330 may couple to a set of base stations and provide coordination and control for these base stations. Network controller 330 may be a single network entity or a collection of network entities. Network controller 330 may communicate with base stations 310 via a backhaul. Backhaul network communication 334 can facilitate point-to-point communication between base stations 310a-310c employing such a distributed architecture. Base stations 310a-310c may also communicate with one another, e.g., directly or indirectly via wireless or wireline backhaul.

Wireless network 300 may be a homogeneous network that includes only macro base stations (not shown in FIG. 3). Wireless network 300 may also be a heterogeneous network that includes base stations of different types, e.g., macro base stations, pico base stations, home base stations, relay stations, etc. These different types of base stations may have different transmit power levels, different coverage areas, and different impact on interference in wireless network 300. For example, macro base stations may have a high transmit power level (e.g., 20 Watts) whereas pico and femto base stations may have a low transmit power level (e.g., 3 Watt). The techniques described herein may be used for homogeneous and heterogeneous networks.

Terminals 320 may be dispersed throughout wireless network 300, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as Global Positioning System (GPS).

In one aspect, to improve system capacity, the coverage area 302a, 302b, or 302c corresponding to a respective base station 310a-310c can be partitioned into multiple smaller areas (e.g., areas 304a, 304b, and 304c). Each of the smaller areas 304a, 304b, and 304c can be served by a respective base transceiver subsystem (BTS, not shown). As used herein and generally in the art, the term "sector" can refer to a BTS and/or its coverage area depending on the context in which the term is used. In one example, sectors 304a, 304b, 304c in a cell 302a, 302b, 302c can be formed by groups of antennas (not shown) at base station 310, where each group of antennas is responsible for communication with terminals 320 in a portion of the cell 302a, 302b, or 302c. For example, a base station 310 serving cell 302a can have a first antenna group corresponding to sector 304a, a second antenna group corresponding to sector 304b, and a third antenna group corresponding to sector 304c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 4:
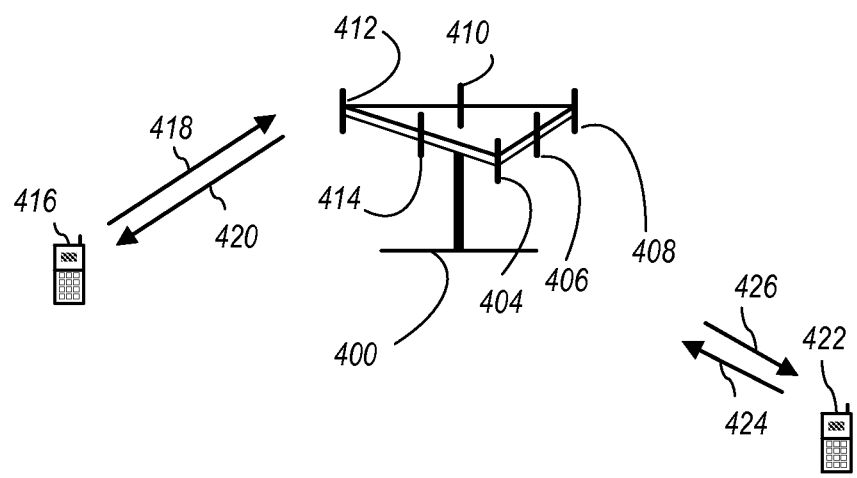
FIG. 4 depicts a block diagram of a multiple access wireless communication system.

Referring to FIG. 4, a multiple access wireless communication system according to one embodiment is illustrated. An access point (AP) 400 includes multiple antenna groups, one including 404 and 406, another including 408 and 410, and an additional including 412 and 414. In FIG. 4, only two antennas are shown for each antenna group, however, more or fewer antennas may be utilized for each antenna group. Access terminal (AT) 416 is in communication with antennas 412 and 414, where antennas 412 and 414 transmit information to access terminal 416 over forward link 420 and receive information from access terminal 416 over reverse link 418.

Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequency for communication. For example, forward link 420 may use a different frequency then that used by reverse link 418.

Each group of antennas and/or the area in which they are designed to communicate is often referred to as a sector of the access point. In the aspect, antenna groups each are designed to communicate to access terminals in a sector, of the areas covered by access point 400.

In communication over forward links 420 and 426, the transmitting antennas of access point 400 utilize beamforming in order to improve the signal-to-noise ratio of forward links for the different access terminals 416 and 422. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 5:
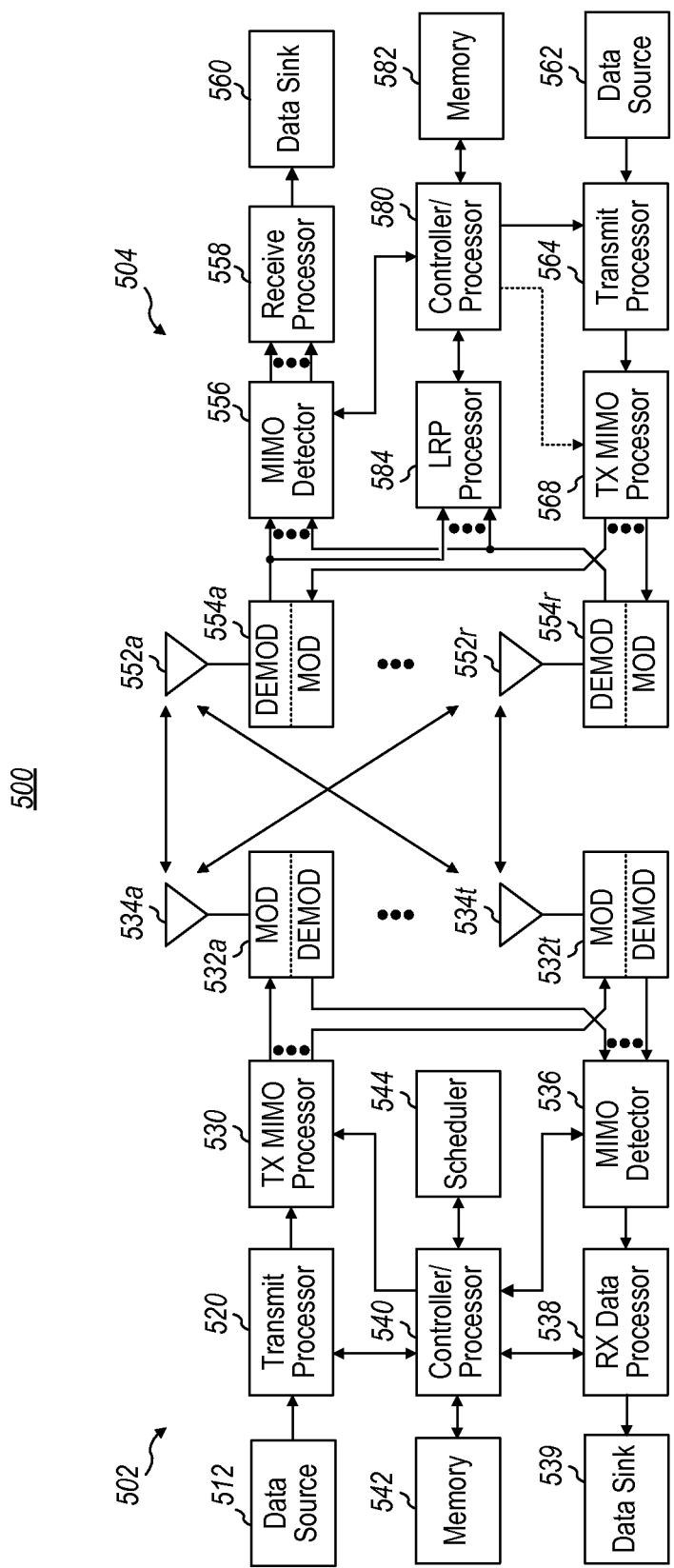
FIG. 5 depicts a block diagram of a communication system between a base station and a terminal.

FIG. 5 shows a block diagram of a design of a communication system 500 between a base station 502 and a terminal 504, which may be one of the base stations and one of the terminals in FIG. 1. Base station 502 may be equipped with TX antennas 534a through 534t, and terminal 504 may be equipped with RX antennas 552a through 552r, where in general $T \geq 1$ and $R \geq 1$.

At base station 502, a transmit processor 520 may receive traffic data from a data source 512 and messages from a controller/processor 540. Transmit processor 520 may process (e.g., encode, interleave, and modulate) the traffic data and messages and provide data symbols and control symbols, respectively. Transmit processor 520 may also generate pilot symbols and data symbols for a low reuse preamble and pilot symbols for other pilots and/or reference signals. A transmit (TX) multiple-input multiple-output (MIMO) processor 530 may perform spatial processing (e.g., precoding) on the data symbols, the control symbols, and/or the pilot symbols, if applicable, and may provide T output symbol streams to T modulators (MODs) 532a through 532t. Each modulator 532 may process a respective output symbol stream (e.g., for OFDM, SC-FDM, etc.) to obtain an output sample stream. Each modulator 532 may further process (e.g., convert to analog, amplify, filter, and upconvert) the output sample stream to obtain a downlink signal. T downlink signals from modulators 532a through 532t may be transmitted via T antennas 534a through 534t, respectively.

At terminal 504, antennas 552a through 552r may receive the downlink signals from base station 502 and may provide received signals to demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, SC-FDM, etc.) to obtain received symbols. A MIMO detector 556 may obtain received symbols from all R demodulators 554a through 554r, perform MIMO detection on the received symbols if applicable, and provide detected symbols. A receive processor 558 may process (e.g., demodulate, deinterleave, and decode) the detected symbols, provide decoded traffic data for terminal 504 to a data sink 560, and provide decoded messages to a controller/processor 580. A low reuse preamble (LRP) processor 584 may detect for low reuse preambles from base stations and provide information for detected base stations or cells to controller/processor 580.

On the uplink, at terminal 504, a transmit processor 564 may receive and process traffic data from a data source 562 and messages from controller/processor 580. The symbols from transmit processor 564 may be precoded by a TX MIMO processor 568 if applicable, further processed by modulators 554a through 554r, and transmitted to base station 502. At base station 502, the uplink signals from terminal 504 may be received by antennas 534, processed by demodulators 532, detected by a MIMO detector 536 if applicable, and further processed by a receive data processor 538 to obtain the decoded packets and messages transmitted by terminal 504 for providing to a data sink 539.

Controllers/processors 540 and 580 may direct the operation at base station 502 and terminal 504, respectively. Processor 540 and/or other processors and modules at base station 502 may perform or direct processes for the techniques described herein. Processor 584 and/or other processors and modules at terminal 504 may perform or direct processes for the techniques described herein. Memories 542 and 582 may store data and program codes for base station 502 and terminal 504, respectively. A scheduler 544 may schedule terminals for data transmission on the downlink and/or uplink and may provide resource grants for the scheduled terminals.

Figure 6:
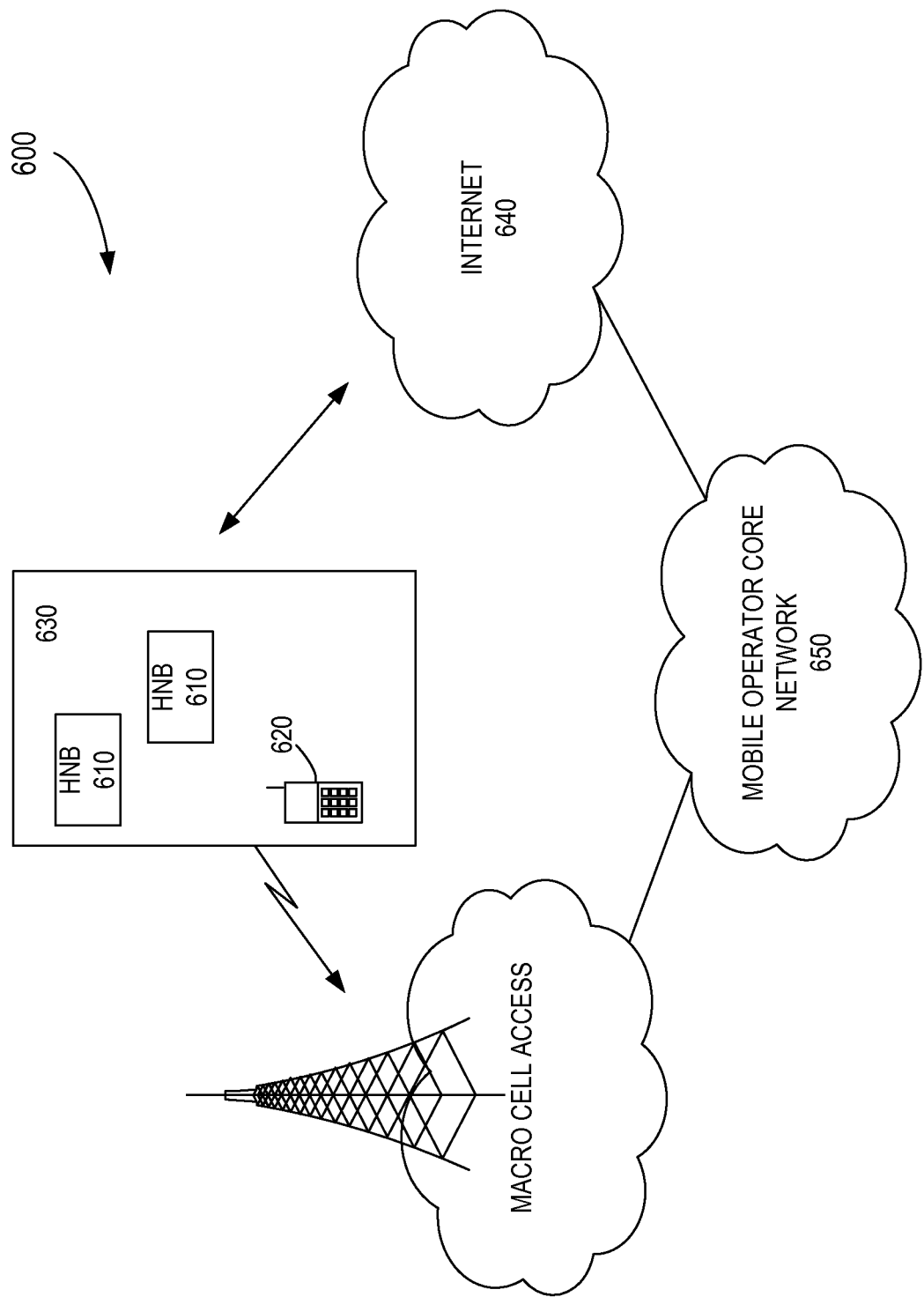
FIG. 6 depicts a block diagram of a communication system to enable deployment of access point base stations within a network environment.

FIG. 6 illustrates an exemplary communication system to enable deployment of access point base stations within a network environment. As shown in FIG. 6, the system 600 includes multiple access point base stations or Home Node B units (HNBs), such as, for example, HNBs 610, each being installed in a corresponding small scale network environment, such as, for example, in one or more user residences 630, and being configured to serve associated, as well as alien, user equipment (UE) 620. Each HNB 610 is further coupled to the Internet 640 and a mobile operator core network 650 via a DSL router (not shown) or, alternatively, a cable modem (not shown), a wireless link, or other Internet connectivity means.

Although aspects described herein use 3GPP terminology, it is to be understood that the embodiments may be applied to 3GPP (Rel99, Rel5, Rel6, Rel7) technology, as well as 3GPP2 (1xRTT, 1xEV-DO Rel0, RevA, RevB) technology and other known and related technologies. In such embodiments described herein, the owner of the HNB 610 subscribes to mobile service, such as, for example, 3G mobile service, offered through the mobile operator core network 650, and the UE 620 is capable to operate both in macro cellular environment and in residential small scale network environment.

MULTI-CARRIER COMMUNICATION WITH ANCHOR AND NON-ANCHOR CARRIERS. In accordance with different aspects, various types of carriers are provided for facilitating mobile communications within different types of cells in a manner that avoids replication of information and hence reduces system overhead. The various carriers can comprise, anchor carriers, non-anchor carriers, segments etc. Anchor carriers can facilitate communications for UEs in both connected mode wherein a UE maintains an active connection with a base station and idle mode wherein a UE has no active connection with the base station. Such idle mode users may only be monitoring the system and are ready to receive pages or access requests as calls generate. Hence, the anchor carriers are by configuration, carriers that are designated to provide synchronization, system information, paging, data and control for Release 8 and/or LTE-A (LTE Advanced) UEs. While there can be several anchor carriers for a given cell, every cell needs at least one anchor carrier. Non-anchor carriers support only UEs in connected mode and hence do not transmit System Information (SI), etc., and hence cannot page UEs. In accordance with various aspects, a communication system with multicarrier deployment is disclosed wherein different types of carriers such as anchor or non-anchor carriers have different capabilities associated therewith to service UEs in different states of connectivity.

It should be appreciated with the benefit of the present disclosure that various kinds of carriers can be differentiated within a communication system in accordance with an aspect. As mentioned supra, carriers can be primarily configured to be anchor or non-anchor carriers based on the information associated therewith. Anchor carriers can be further differentiated as backward compatible single carrier anchor, backward compatible multicarrier anchor, and Rel-8 non-backward compatible anchor. In addition, other non-anchor carriers can include Rel-8 non-backward compatible carriers. Segments are non-carriers that cannot independently support a UE for communication but provide communication facilities in conjunction with an anchor/non-anchor carrier as will be detailed infra.

Another aspect is associated with differentiation among carriers such that different carriers offer different services to user conforming to different releases of the LTE standards. Backward compatible single carrier anchor carrier provides service to different kinds of UEs that include UEs that have upgraded to Rel-8 of LTE and UEs that have yet to upgrade to Rel-8. In addition, a single carrier anchor carrier comprises information associated with only one anchor carrier. For example, it can carry PSS/SSS (primary/secondary synchronization sequences), Rel-8 system information (SI), paging etc. in accordance with various aspects. Hence, a backward compatible single carrier anchor is a carrier comprising information associated with only one anchor carrier and which provides camping and access for users having different versions of LTE standards. In accordance with another aspect, the backward compatible single carrier anchor carrier can comprise information that points to a multicarrier anchor carrier. This pointer can be used to obtain SI associated with the relevant multicarrier anchor carrier. In different aspects, the pointer can only be used by UEs subscribing to a specified version of the LTE standard. For example, the pointer can be intended only for the LTE-A UEs and can be transparent to Rel-8 UEs.

The second type of anchor carrier is the backward compatible multicarrier anchor. As mentioned supra, a backward compatible carrier supports users having different versions of the LTE standard. In accordance with a detailed aspect, the backward compatible multicarrier anchor can provide PSS/SSS, Rel-8 system information, paging etc. for different UEs. In a further aspect, it can carry information associated with different carriers in additional SIBs (system information blocks) that provide the multicarrier information for a cell. Multicarrier information such as carrier locations, carrier bandwidths, carrier designation (UL/DL), carrier pairing, other anchor carrier, and new control regions can all be delivered to various UEs subscribing to different LTE standards in both connected and idle modes. Hence, it is configured to provide information about other carriers so that users can monitor other carriers based on the information obtained from a given multicarrier anchor. Rel-8 non-backward compatible anchor is a third type of anchor carrier that supports only users who subscribe to Rel-8 of LTE. Hence, it supports UEs subscribing to LTE Rel-8 in a RRC connected or RRC idle mode by transmitting SI, synchronization, paging and other services. However, Rel-8 non-backward compatible anchor does not support UEs that have not upgraded to this version of LTE. Additionally, Rel-8 non-backward compatible anchor bears multicarrier system information associated with other carriers that can be monitored by a UE in order to track other carriers that provide service within a given cell.

Rel-8 non-backward compatible carrier is a stand-alone carrier used only for LTE-A UEs in RRC connected state. Hence, it can be designated as a non-anchor carrier that does not permit UEs to camp on it. As a result, SI updates are provided on an event-driven basis as multi-cast or in-band, for example, when the SI changes and users need to be updated with such changes. It carries new synchronization signal to keep the LTE-A UE synchronization in RRC connected state. Synchronization signals can be omitted, provided that the synchronization is possible on at least one other carrier of the same cell an LTE-A UE is configured for.

Figure 7:
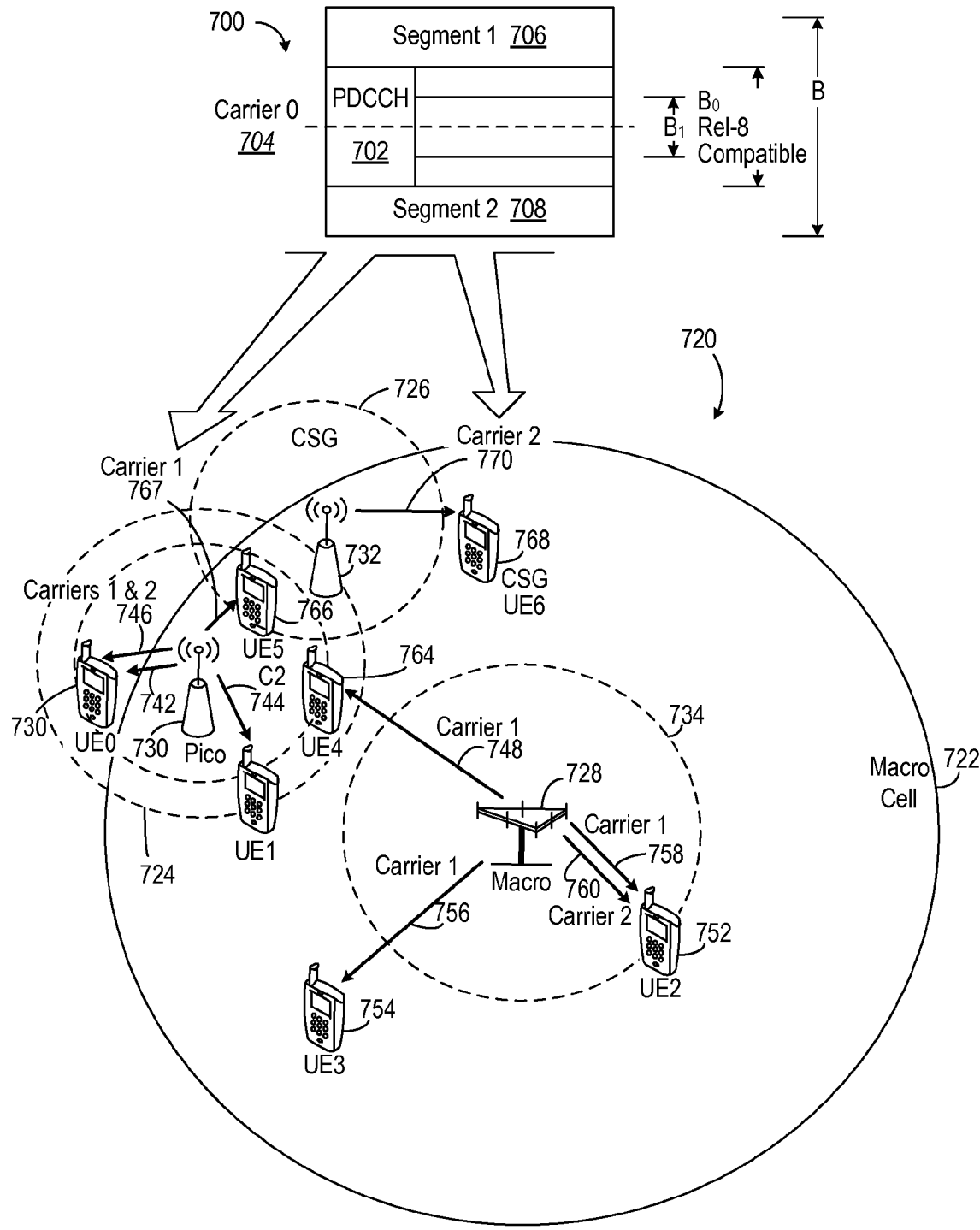
FIG. 7 illustrates various kinds of carriers differentiated within a communication system in accordance with an aspect.

In FIG. 7, a downlink (DL) carrier 700 is depicted as providing a PDCCH (Packet Data Control Channel) 702 that facilitates communication in accordance with another aspect. The transmission comprises a Carrier 0 704 and two segments, Segment 1 706 and Segment 2 708. As mentioned supra, a carrier 700 can independently support a UE connection to a base station. A segment is an extension of a carrier that comprises additional signaling resources that support a UE connection with a base station in conjunction with a carrier. Hence, a segment is always linked to a carrier and cannot independently support UE communications with a base station. In an aspect, the segment is configured as a pure data extension devoid of synchronization signals, SI (System Information) or paging capability. Thus, segments are a further refinement of the concept of a non-anchor carrier which does not provide paging capability since it serves only UEs in RRC (Radio Resource Control) connected mode. Alternatively, the segments can provide synchronization and control aspects.

In the illustrative depiction, Carrier 0 704 can independently support a UE communications but has additional resources in the form of two segments—Segment 1 706 and Segment 2 708 associated therewith. Each of these segments 706, 708 cannot independently support UE connections but facilitate communications in association with a single Carrier 0 704. Carrier 0 704 can be an anchor or a non-anchor carrier in accordance with different aspects. Thus, while a UE monitoring a carrier is capable of facilitating communications, a UE cannot receive service if it is monitoring only a segment.

An anchor carrier can therefore be used to reduce system overhead as it mitigates replication of information. This is because, general purpose information can be concentrated on a small subset of carriers while other carriers can support connected mode users without replicating redundant information. Segments within a communication system can further reduce replicating information by carrying only a data and a dedicated control channel but none of the steady state channels needed to support connected mode users. Additionally, such differentiation within carriers facilitates better synchronization, camping and access in a heterogeneous environment as further detailed infra. Interference coordination can provide for at least one detectable (accessible) anchor carrier.

With further reference to FIG. 7, a heterogeneous system 720 that can utilize multiple carriers is depicted as comprising a macro cell 722, a pico cell 724 and a CSG (closed subscriber group) cell 726. The latter can comprise a femto-cell. In accordance with an aspect, a macro base station 728 can be transmitting with high power while a pico base station 730 and a femto base station 732 can be transmitting with lower power. In this system, service can be extended into the pico cell 724 by reducing the amount of power the macro base station 728 transmits on certain carriers. Hence, the macro cell 722 can designate certain carriers as anchor carriers and certain carriers as non-anchor carriers. The macro cell 722 can transmit anchor carriers at normal power and non-anchor carriers at lower power that can match the pico base station 730. In the figure, Carrier 1 is an anchor carrier for the macro cell 722 and hence is transmitted at normal power while Carrier 2 is a non-anchor carrier for the macro cell 722 and hence can be transmitted at lower power, depicted as an inner limit 734 that falls short of the pico cell 724 and CSG cell 726. Pico cell 724 can be configured to provide Carrier 1 and Carrier 2 as anchor carriers. CSG cell 726 is a cell that only admits certain authorized users to connect to it and therefore users who are not authorized to access the CSG resources will not be able to connect via the CSG 732. A femto cell wherein UEs communicate with each other via an IP network is an example of a CSG cell. As CSG 732 does not permit all users to access its resources, it can cause interference within the heterogeneous environment. That is, an unsubscribing UE can be jammed by the CSG 732 as a relatively strong carrier but have to use a subjectively lower power cell for service. Therefore, to protect the macro and pico base stations 722, 724 from such interference, the CSG cell 726 can be designated to transmit only on carrier 2 and not on Carrier 1. This mitigates interference on Carrier 1 thereby facilitating user equipment to connect via a nearest macro/pico BS 728, 730.

As depicted, Carrier 2 is an anchor carrier within the pico cell 724. Therefore, Pico cell served UEs 0 and 1 738, 740 can be scheduled on Pico anchor carrier 2 as depicted respectively at 742, 744. In addition, UE 0 738 can be scheduled by the pico base station 730 on carrier 1 as depicted at 746 as the interference from the Macro BS 728 seen by that UE 0 738 on carrier 1 is very weak. However, UE 1 740 experiences stronger interference from the Macro BS 728 on carrier 1 as depicted at 748, and therefore will only be scheduled by the Pico BS 730 on Carrier 2 as depicted at 744. UE 2 752 and UE 3 754 are served by the Macro BS 728 and hence are scheduled on Macro anchor Carrier 1 as depicted respectively at 756, 758. In addition, UE 2 752 can be scheduled by Macro BS 728 on Carrier 2 as depicted at 760 since it is close enough to the Macro BS 728 and falls within the coverage range of Carrier 2 as depicted at 734 unlike UE 3 744 which lies outside the coverage range 734 of Carrier 2 due to the lower transmit power on this particular carrier from the Macro BS 728.

UE 4 764 and UE 5 766 are within the coverage range of the CSG cell 726 but are not permitted to access its resources. However, these UEs 764, 766 have access to Macro anchor Carrier 1. Therefore, while UE 4 764 is within the coverage area of both Macro and Pico cells 722, 724, it will be connected on Carrier 1 to Macro cell 722 as the signal from the Macro cell 722 is stronger. Similarly while UE 5 766 is within the coverage area of both Macro and Pico cell 724, 726 on Carrier 1, it will be connected on this carrier to Pico cell 724 as depicted 767 as the signal from the Pico cell 724 is stronger. UE 6 768 has permission to access the CSG cell 726 and hence will be connected to it on its anchor Carrier 2 as depicted at 770.

Figure 8:
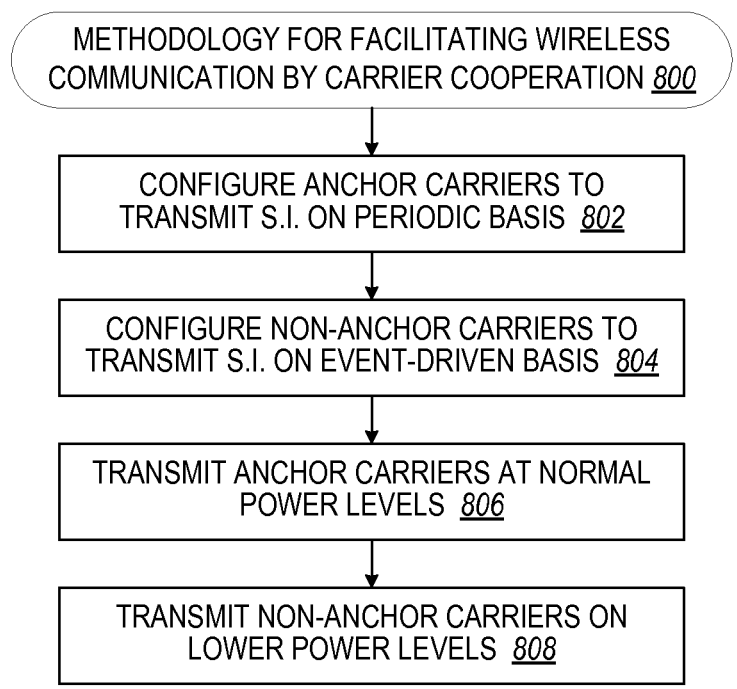
FIG. 8 depicts a flow diagram of a methodology for facilitating communications in a wireless communication system by coordinating carrier selection and transmit power control between carriers.
Figure 9:
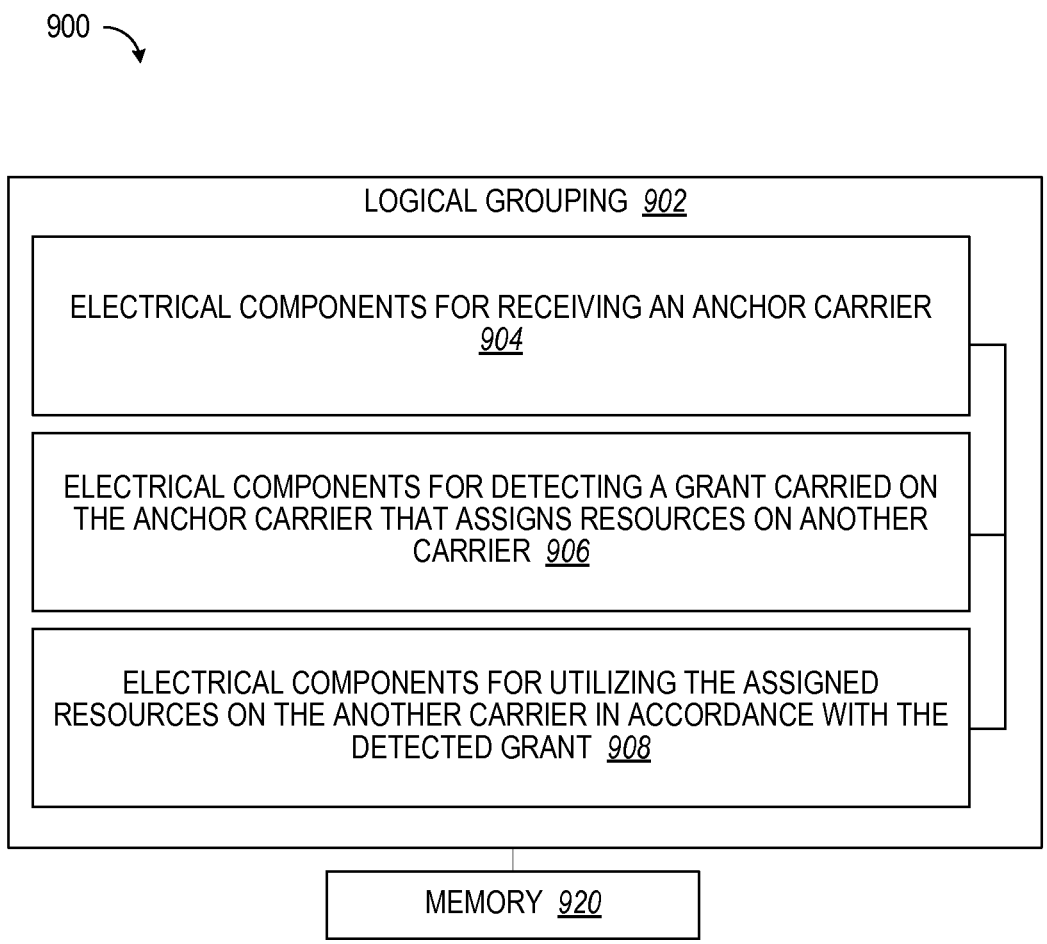
FIG. 9 depicts a block diagram for a system such as user equipment containing logical groupings of electrical components for multicarrier wireless communication.

FIG. 8 illustrates a methodology 800 of facilitating communications in a wireless communication system in accordance with an aspect. The method begins at 802 wherein one or more anchor carriers are initially configured to carry SI to UEs within a cell on a periodic basis. As mentioned supra, such anchor carriers can facilitate communications for UEs which are either in a RRC idle mode or for those UEs in a connected mode. At 804, one or more non-anchor carriers are also configured to carry SI on an event-driven basis. For example, if the SI changes, then non-anchor carriers can be employed to transmit such changes to UEs based on a need to update the UEs. However, unlike anchor carriers, non-anchor carriers can facilitate communications for UEs which are only in a connected mode and cannot facilitate communications for UEs in an idle mode. This is because, the carriers are configured into anchor and non-anchor carriers in a manner that reduces replication of information transmitted in a wireless communication system whereby only anchor carriers are able to provide paging capabilities. Therefore, in order to facilitate communications, each base station has at least one anchor carrier associated therewith. At 806, the anchor carriers are transmitted at a power level that is normally used by the base stations for its transmission. At 808, the non-anchor carriers are transmitted at power levels lower than the normal power levels and the method terminates at the end block. This differentiation in transmission power levels associated with anchor/non-anchor carriers facilitates better interference coordination. Reducing power levels on certain carriers, such as non-anchor carriers, enables deeper penetration of certain other carriers such as anchor carriers. This mitigates interference for these anchor carriers thereby providing for at least one detectable (accessible) anchor carrier With reference to FIG. 9, illustrated is a system 900 for multiple carrier communication. For example, system 900 can reside at least partially within user equipment, mobile device, or access terminal. It is to be appreciated that system 900 is represented as including functional blocks, which can be functional blocks that represent functions implemented by a computing platform, processor, software, or combination thereof (e.g., firmware). System 900 includes a logical grouping 902 of electrical components that can act in conjunction. For instance, logical grouping 902 can include an electrical component for receiving an anchor carrier 904. Moreover, logical grouping 902 can include an electrical component for detecting a grant carried on the anchor carrier that assigns resources on another carrier 906. Further, logical grouping 902 can include an electrical component for utilizing the assigned resources on the another carrier in accordance with the detected grant 908. Additionally, system 900 can include a memory 920 that retains instructions for executing functions associated with electrical components 904-908. While shown as being external to memory 920, it is to be understood that one or more of electrical components 904-908 can exist within memory 920.

Figure 10:
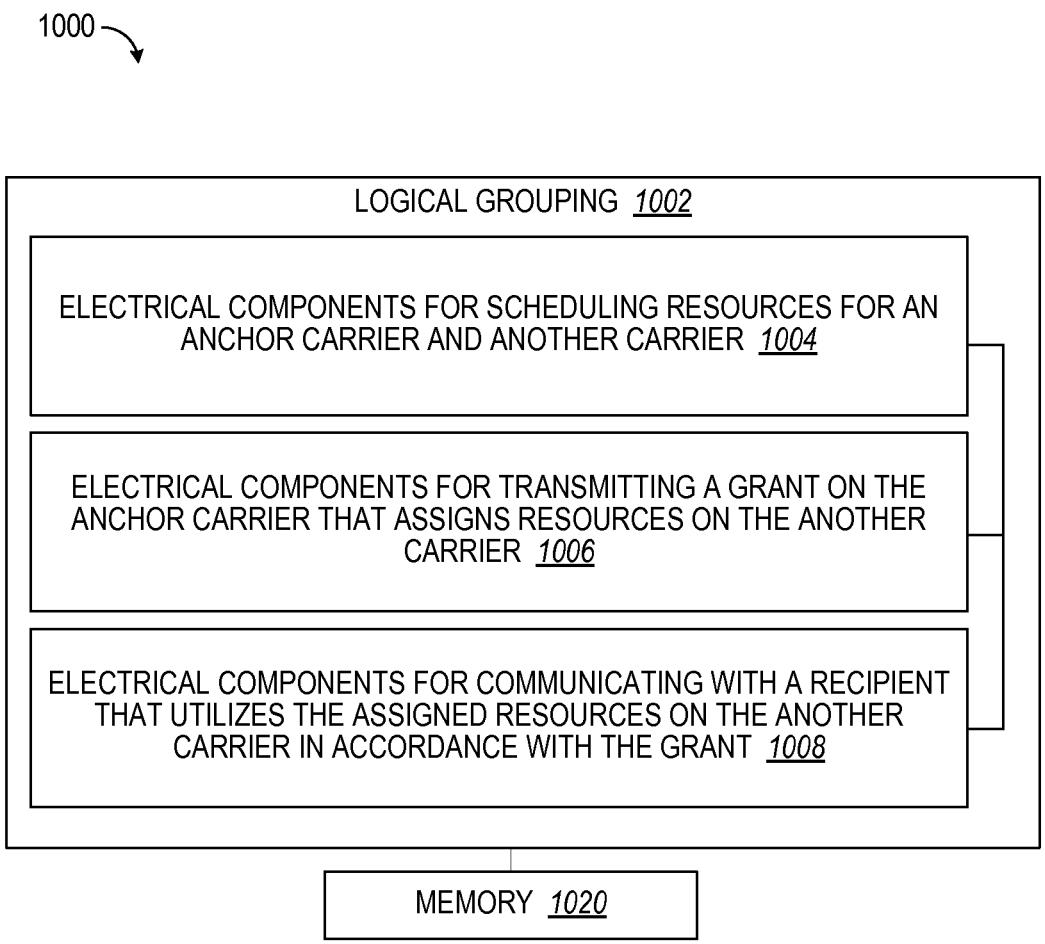
FIG. 10 depicts a block diagram for a system such as a network node containing logical groupings of electrical components for multicarrier wireless communication.

With reference to FIG. 10, illustrated is a system 1000 for multiple carrier communication. For example, system 1000 can reside at least partially within a base station. It is to be appreciated that system 1000 is represented as including functional blocks, which can be functional blocks that represent functions implemented by a computing platform, processor, software, or combination thereof (e.g., firmware). System 1000 includes a logical grouping 1002 of electrical components that can act in conjunction. For instance, logical grouping 1002 can include an electrical component for scheduling resources for an anchor carrier and another carrier 1004. Moreover, logical grouping 1002 can include an electrical component for transmitting a grant on the anchor carrier that assigns resources on the another carrier 1006. Further, logical grouping 1002 can include an electrical component for communicating with a recipient that utilizes the assigned resources on the another carrier in accordance with the grant 1008. Additionally, system 1000 can include a memory 1020 that retains instructions for executing functions associated with electrical components 1004-1008. While shown as being external to memory 1020, it is to be understood that one or more of electrical components 1004-1008 can exist within memory 1020.

Figure 11:
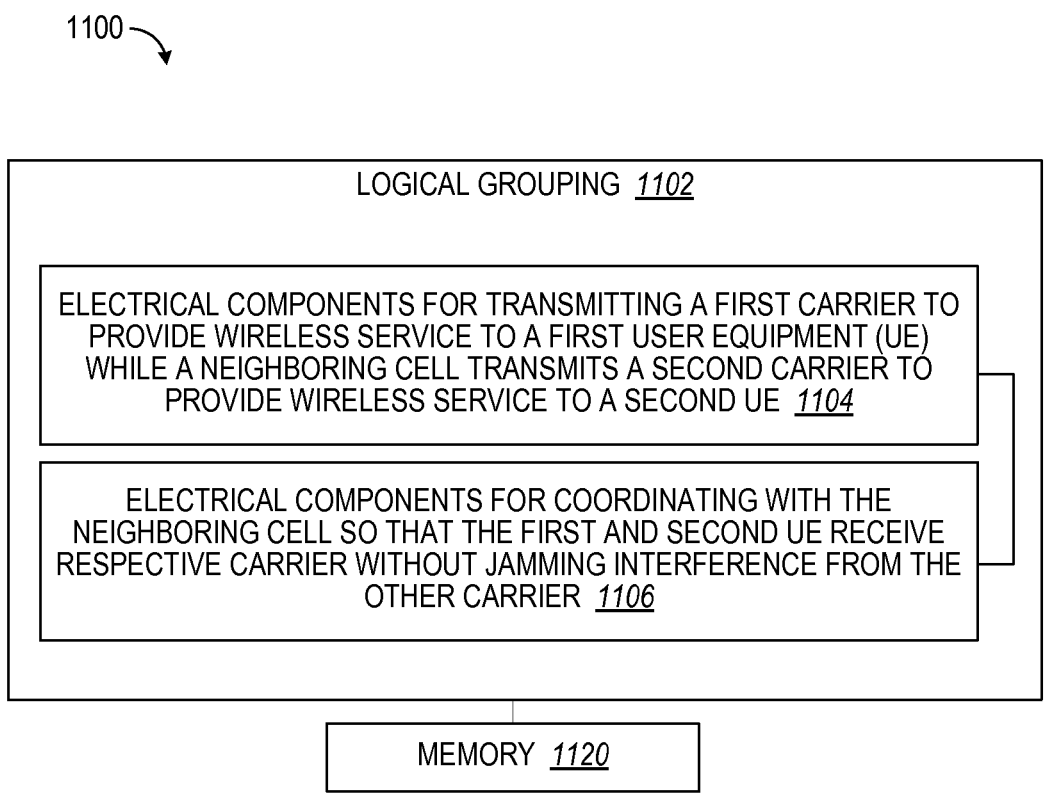
FIG. 11 depicts a block diagram for a system such as a network node containing logical groupings of electrical components for coordinating carrier selection and transmit power control between carriers.

With reference to FIG. 11, illustrated is a system 1100 for coordinating carrier transmission between nodes. For example, system 1100 can reside at least partially within a base station. It is to be appreciated that system 1100 is represented as including functional blocks, which can be functional blocks that represent functions implemented by a computing platform, processor, software, or combination thereof (e.g., firmware). System 1100 includes a logical grouping 1102 of electrical components that can act in conjunction. For instance, logical grouping 1102 can include an electrical component for transmitting a first carrier to provide wireless service to a first user equipment (UE) while a neighboring cell transmits a second carrier to provide wireless service to a second UE 1104. Moreover, logical grouping 1102 can include an electrical component for coordinating with the neighboring cell so that the first and second UE receive respective carrier without jamming interference from the other carrier 1106. Additionally, system 1100 can include a memory 1120 that retains instructions for executing functions associated with electrical components 1104-1106. While shown as being external to memory 1120, it is to be understood that one or more of electrical components 1104-1106 can exist within memory 1120.

Figure 12:
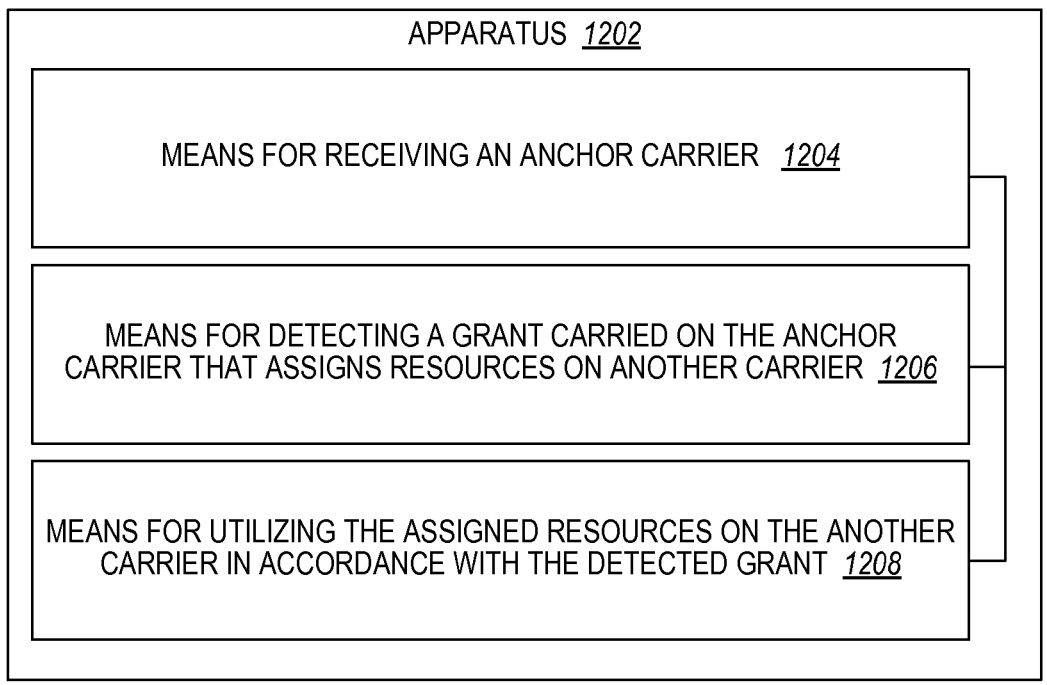
FIG. 12 depicts a block diagram for an apparatus having means for multicarrier wireless communication.

With reference to FIG. 12, an apparatus 1200 is provides for multiple carrier communication. Means 1204 are provided for receiving an anchor carrier. Means 1206 are provided for detecting a grant carried on the anchor carrier that assigns resources on another carrier. Means 1208 are provided for utilizing the assigned resources on the another carrier in accordance with the detected grant.

Figure 13:
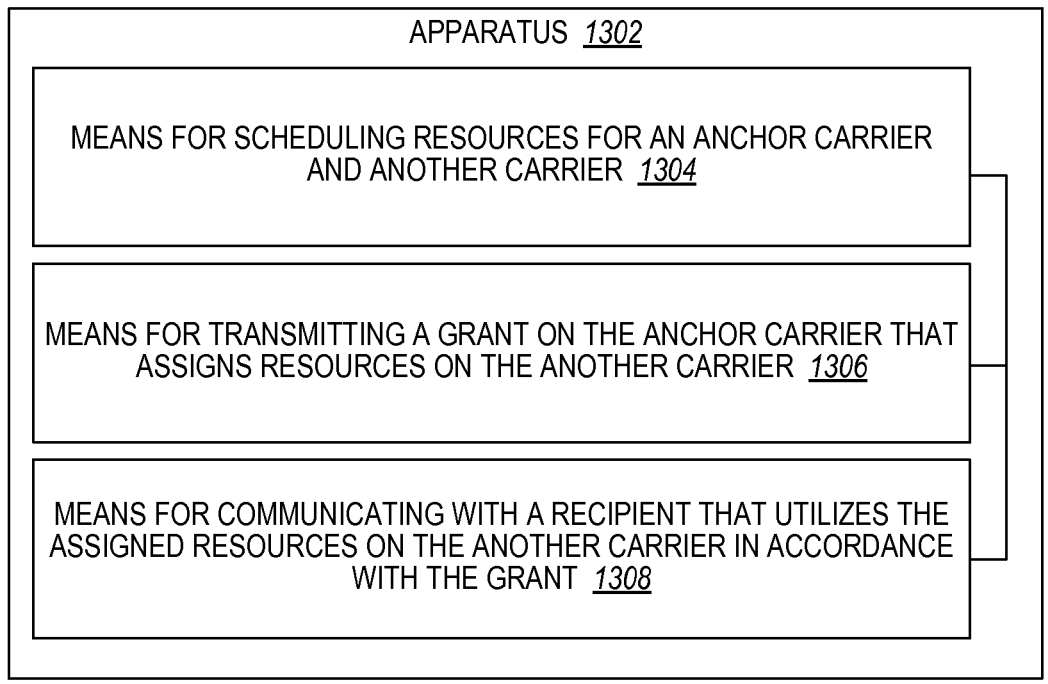
FIG. 13 depicts a block diagram for an apparatus having means for multicarrier wireless communication.

With reference to FIG. 13, an apparatus 1300 is provides for multiple carrier communication. Means 1304 are provided for scheduling resources for an anchor carrier and another carrier. Means 1306 are provided for transmitting a grant on the anchor carrier that assigns resources on the another carrier. Means 1308 are provided for communicating with a recipient that utilizes the assigned resources on the another carrier in accordance with the grant.

Figure 14:
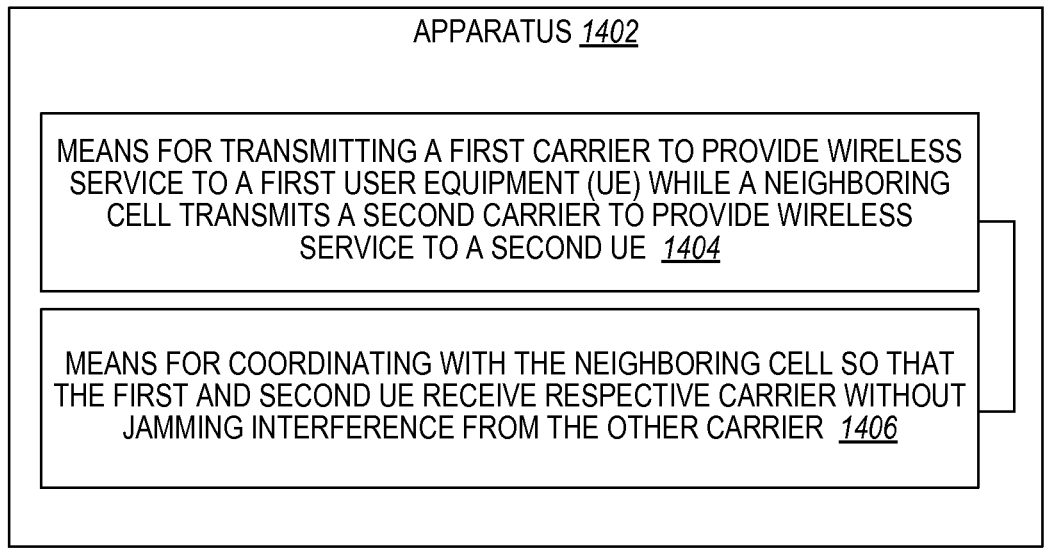
FIG. 14 depicts a block diagram for an apparatus having means for coordinating carrier selection and transmit power control between carriers.

With reference to FIG. 14, an apparatus 1400 is provides for coordinating carrier transmission between nodes. Means 1404 are provided for transmitting a first carrier to provide wireless service to a first user equipment (UE) while a neighboring cell transmits a second carrier to provide wireless service to a second UE. Means 1406 are provided for coordinating with the neighboring cell so that the first and second UE receive respective carrier without jamming interference from the other carrier.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for multiple carrier wireless communication, comprising:
   receiving an anchor carrier;
   detecting an uplink grant carried on the anchor carrier that assigns resources for a group of uplink non-anchor carriers;
   utilizing the assigned resources by transmitting uplink carrier transmissions on the group of uplink non-anchor carriers in accordance with the detected grant;
   receiving an acknowledgement of receipt of the uplink carrier transmissions on the anchor carrier that sent the uplink grant;
   accessing a mapping of acknowledgements to multiple carriers;
   interpreting the acknowledgement for each uplink carrier transmission utilizing the mapping; and
   retransmitting at least one of the uplink carrier transmissions, wherein the at least one of the uplink carrier transmissions is determined to have been unsuccessfully transmitted.

2. The method of claim 1, further comprising:
   detecting a common system information on the anchor carrier; and
   acquiring at least one of the uplink non-anchor carriers by using the common system information.

3. The method of claim 1, further comprising:
   receiving a dedicated information on the anchor carrier; and
   acquiring at least one of the uplink non-anchor carriers by using the dedicated information.

4. The method of claim 1, further comprising:
   receiving one of a plurality of anchor carriers, each anchor carrier for assigning resources on a group of carriers.

5. The method of claim 1, further comprising:
   receiving a non-anchor carrier; and
   detecting a grant carried on the non-anchor carrier that assigns resources on the non-anchor carrier.

6. The method of claim 1, further comprising receiving a non-anchor carrier that was previously received as the anchor carrier subsequent to another carrier no longer requiring assignment of resources.

7. The method of claim 1, further comprising:
   initiating single carrier communication by synchronizing to the anchor carrier; and
   detecting a grant on the anchor carrier for a single carrier configured user equipment.

8. The method of claim 7, further comprising:
   synchronizing to primary and secondary synchronization signals of the anchor carrier;
   detecting a master information block on a Physical Broadcast Channel for identifying system bandwidth, Physical Hybrid Automatic Repeat Request Indicator Channel (PHICH) configuration, and system frame number; and
   detecting system information blocks on a downlink shared channel (DL-SCH) for resources on the anchor carrier.

9. The method of claim 7, further comprising detecting the grant on the anchor carrier for the single carrier configured user equipment by executing a redirection message to another carrier by intra-cell inter-frequency handover.

10. The method of claim 1, further comprising detecting system information blocks on the anchor carrier for utilizing the another carrier comprising carrier location, carrier bandwidth, carrier uplink or downlink designation, carrier pairing, and a new control region.

11. The method of claim 1, further comprising:
    determining an implicit pairing to an uplink carrier.

12. The method of claim 1, further comprising:
    detecting an explicitly identified uplink carrier.

13. The method of claim 1, further comprising transmitting channel quality indicator (CQI) feedback for multiple downlink carriers on an uplink anchor carrier.

14. The method of claim 13, further comprising detecting CQI feedback configuration by detecting an additional system information block on the anchor carrier.

15. The method of claim 13, further comprising detecting CQI feedback configuration by detecting resource radio control (RRC) signaling.

16. The method of claim 1, further comprising:
    reporting channel quality indicator (CQI) feedback conveying interference jamming receipt of another carrier; and
    receiving a grant assigning resources on a carrier not jammed by the interference.

17. The method of claim 16, further comprising receiving the grant that assigns resources on the carrier not jammed by the interference subsequent to a transmit power control change by either a serving node or an interfering node for multiple carrier reuse.

18. The method of claim 1, further comprising:
    receiving interference jamming receipt of the anchor carrier;
    acquiring another carrier comprising a non-anchor carrier; and
    detecting a grant carried on the non-anchor carrier that assigns resources on the non-anchor carrier.

19. A computer program product for multiple carrier communication, comprising:
    at least one computer readable, non-transitory, storage medium storing computer executable instructions that when executed by at least one processor implement components comprising:
    a first set of instructions for causing a computer to receive an anchor carrier;
    a second set of instructions for causing the computer to detect an uplink grant carried on the anchor carrier that assigns resources for a group of uplink non-anchor carriers;
    a third set of instructions for causing the computer to utilize the assigned resources by transmitting uplink carrier transmissions on the group of uplink non-anchor carriers in accordance with the detected grant;
    a fourth set of instructions for causing the computer to receive an acknowledgement of receipt of the uplink carrier transmissions on the anchor carrier that sent the uplink grant;
    a fifth set of instructions for causing the computer to access a mapping of acknowledgements to multiple carriers;
    a sixth set of instructions for causing the computer to interpret the acknowledgement for each uplink carrier transmission utilizing the mapping; and
    a seventh set of instructions for causing the computer to retransmit at least one of the uplink carrier transmissions, wherein the at least one of the uplink carrier transmissions is determined to have been unsuccessfully transmitted.

20. An apparatus for multiple carrier communication, comprising:
- at least one processor;
- at least one computer readable storage medium storing computer executable instructions that when executed by the at least one processor implement components comprising:
- means for receiving an anchor carrier;
- means for detecting an uplink grant carried on the anchor carrier that assigns resources for a group on uplink non-anchor carriers;
- means for utilizing the assigned resources by transmitting uplink carrier transmissions on the group of uplink non-anchor carriers in accordance with the detected grant;
- means for receiving an acknowledgement of receipt of the uplink carrier transmissions on the anchor carrier that sent the uplink grant;
- means for accessing a mapping of acknowledgements to multiple carriers;
- means for interpreting the acknowledgement for each uplink carrier transmission utilizing the mapping; and
- means for retransmitting at least one of the uplink carrier transmissions, wherein the at least one of the uplink carrier transmissions is determined to have been unsuccessfully transmitted.

21. An apparatus for multiple carrier wireless communication, comprising:
- a transmitter;
- a receiver for receiving an anchor carrier; and
- a computing platform for detecting an uplink grant carried on the anchor carrier that assigns resources for a group of uplink non-anchor carriers and
- for utilizing the assigned resources via the transmitter by transmitting uplink carrier transmissions on the group of uplink non-anchor carriers in accordance with the detected grant,
- the receiver is further for receiving an acknowledgement of receipt of the uplink carrier transmissions on the anchor carrier that sent the uplink grant,
- the computing platform is further for accessing a mapping of acknowledgements to multiple carriers and interpreting the acknowledgement for each uplink carrier transmission utilizing the mapping, and
- the transmitter is further for retransmitting at least one of the uplink carrier transmissions, wherein the at least one of the uplink carrier transmissions is determined to have been unsuccessfully transmitted.

22. The apparatus of claim 21, wherein the computing platform is further for detecting common system information on the anchor carrier; and
- the receiver is further for acquiring at least one of the uplink non-anchor carriers by using the common system information.

23. The apparatus of claim 21, wherein the receiver is further for receiving dedicated information on the anchor carrier, and for acquiring at least one of the uplink non-anchor carriers by using the dedicated information.

24. The apparatus of claim 21, wherein the receiver is further for receiving one of a plurality of anchor carriers, each of the plurality of anchor carriers for assigning resources on a group of carriers.

25. The apparatus of claim 21, wherein the receiver is further for receiving a non-anchor carrier; and
- the computing platform is further for detecting a grant carried on the non-anchor carrier that assigns resources on the non-anchor carrier.

26. The apparatus of claim 21, wherein the receiver is further for receiving a non-anchor carrier that was previously received as the anchor carrier subsequent to another carrier no longer requiring assignment of resources.

27. The apparatus of claim 21, wherein the transmitter is further for initiating single carrier communication by synchronizing to the anchor carrier; and
- the computing platform is further for detecting a grant on the anchor carrier for a single carrier configured user equipment.

28. The apparatus of claim 27, wherein the receiver is further for synchronizing to primary and secondary synchronization signals of the anchor carrier; and
- the computing platform is further for detecting master information block on a Physical Broadcast Channel for identifying system bandwidth, Physical Hybrid Automatic Repeat Request Indicator Channel (PHICH) configuration, and system frame number, and for detecting system information blocks on a downlink shared channel (DL-SCH) for resources on the anchor carrier.

29. The apparatus of claim 27, wherein the computing platform is further for detecting the grant on the anchor carrier for the single carrier configured user equipment by executing a redirection message to another carrier by intra-cell inter-frequency handover.

30. The apparatus of claim 21, wherein the computing platform is further for detecting system information blocks on the anchor carrier for utilizing another carrier comprising carrier location, carrier bandwidth, carrier uplink or downlink designation, carrier pairing, and a new control region.

31. The apparatus of claim 21, wherein
- the computing platform is further for determining an implicit pairing to the uplink carrier.

32. The apparatus of claim 21, wherein
- the computing platform is further for detecting an explicitly identified uplink carrier.

33. The apparatus of claim 21, wherein the transmitter is further for transmitting channel quality indicator (CQI) feedback for multiple downlink carriers on an uplink anchor carrier.

34. The apparatus of claim 33, wherein the computing platform is further for detecting CQI feedback configuration by detecting an additional system information block on the anchor carrier.

35. The apparatus of claim 33, wherein the computing platform is further for detecting CQI feedback configuration by detecting resource radio control (RRC) signaling.

36. The apparatus of claim 21, wherein the transmitter is further for reporting channel quality indicator (CQI) feedback conveying interference jamming receipt of another carrier; and
- the receiver is further for receiving a grant assigning resources on a carrier not jammed by the interference.

37. The apparatus of claim 36, wherein the receiver is further for receiving the grant assigning resources on the carrier not jammed by the interference subsequent to a transmit power control change by either a serving node or an interfering node for multiple carrier reuse.

38. The apparatus of claim 21, wherein the receiver is further for receiving interference jamming receipt of the anchor carrier and for acquiring another carrier comprising a non-anchor carrier; and
- the computing platform is further for detecting a grant carried on the non-anchor carrier that assigns resources on the non-anchor carrier.

39. A method for multiple carrier wireless communication, comprising:
- scheduling resources for an anchor carrier and a group of non-anchor uplink carriers;
- transmitting an uplink grant on the anchor carrier that assigns resources for the group of non-anchor uplink carriers;
- communicating with a recipient that utilizes the assigned resources to transmit uplink carrier transmissions on the group of non-anchor uplink carriers in accordance with the grant;
- accessing a mapping of acknowledgements to multiple carriers;
- transmitting an acknowledgement of receipt of the uplink carrier transmissions on the anchor carrier that sent the uplink grant; and
- receiving retransmission of at least one of the uplink carrier transmissions if the at least one of the uplink carrier transmissions was not acknowledged as successfully received.

40. The method of claim 39, further comprising:
- determining common system information for acquiring at least one of the non-anchor carriers; and transmitting the common system information on the anchor carrier.

41. The method of claim 39, further comprising:
- determining dedicated information for acquiring at least one of the non-anchor carriers; and
- transmitting the dedicated information on the anchor carrier.

42. The method of claim 39, further comprising transmitting one of a plurality of anchor carriers, each anchor carrier for assigning resources on a group of carriers.

43. The method of claim 39, further comprising transmitting a grant on a non-anchor carrier that assigns resources on the non-anchor carrier.

44. The method of claim 43, further comprising:
- determining that no scheduling is necessary for non-anchor carriers; and transmitting a non-anchor carrier that was previously transmitted as the anchor carrier.

45. The method of claim 39, further comprising:
- receiving an initiation of single carrier communication; and
- transmitting a grant on the anchor carrier for a single carrier configured user equipment.

46. The method of claim 45, further comprising:
- transmitting primary and secondary synchronization signals on the anchor carrier;
- transmitting master information block on a Physical Broadcast Channel for identifying system bandwidth, Physical Hybrid Automatic Repeat Request Indicator Channel (PHICH) configuration, and system frame number; and
- transmitting system information blocks on a downlink shared channel (DL-SCH) for resources on the anchor carrier.

47. The method of claim 45, further comprising transmitting the grant on the anchor carrier for the single carrier configured user equipment by transmitting a redirection message to another carrier by intra-cell inter-frequency handover.

48. The method of claim 39, further comprising transmitting system information blocks on the anchor carrier for utilizing the another carrier comprising carrier location, carrier bandwidth, carrier uplink or downlink designation, carrier pairing, and a new control region.

49. The method of claim 39, further comprising transmitting the uplink grant on the anchor carrier with an implicit pairing to an uplink carrier.

50. The method of claim 39, further comprising transmitting the uplink grant on the anchor carrier with an explicitly identified uplink carrier.

51. The method of claim 39, further comprising receiving channel quality indicator (CQI) feedback for multiple downlink carriers on an uplink anchor carrier.

52. The method of claim 51, further comprising transmitting CQI feedback configuration by an additional system information block on the anchor carrier.

53. The method of claim 51, further comprising transmitting CQI feedback configuration by resource radio control (RRC) signaling.

54. The method of claim 51, further comprising:
- receiving channel quality indicator (CQI) feedback conveying interference jamming receipt of the another carrier; and
- transmitting a grant assigning resources on a carrier not jammed by the interference.

55. The method of claim 54, further comprising:
- selecting an anchor carrier that does not interfere with a neighboring anchor carrier for multiple carrier reuse.

56. The method of claim 55, further comprising adjusting transmit power of the anchor carrier to avoid interfering with the neighboring anchor carrier.

57. The method of claim 55, further comprising requesting adjustment of transmit power of the neighboring anchor carrier by backhaul communication.

58. The method of claim 54, further comprising:
- transmitting the anchor carrier that is being jammed by interference;
- transmitting another carrier comprising a non-anchor carrier; and
- transmitting a grant on the non-anchor carrier that assigns resources on the non-anchor carrier.

59. A computer program product for multiple carrier wireless communication, comprising:
- at least one computer readable, non-transitory, storage medium storing computer executable instructions that when executed by at least one processor implement components comprising:
- a first set of instructions for causing a computer to schedule resources for an anchor carrier and a group of non-anchor uplink carriers;
- a second set of instructions for causing the computer to transmit an uplink grant on the anchor carrier that assigns resources for the group of non-anchor uplink carriers;
- a third set of instructions for causing the computer to communicate with a recipient that utilizes the assigned resources to transmit uplink carrier transmissions on the group of non-anchor uplink carriers in accordance with the grant;
- a fourth set of instructions for causing the computer to access a mapping of acknowledgements to multiple carriers;
- a fifth set of instructions for causing the computer to transmit an acknowledgement of receipt of the uplink carrier transmissions on the anchor carrier that sent the uplink grant; and
- a sixth set of instructions for causing the computer to receive retransmission of at least one of the uplink carrier transmissions if the at least one of the uplink carrier transmissions was not acknowledged as successfully received.

60. An apparatus for multiple carrier wireless communication, comprising:
- at least one processor;
- at least one computer readable storage medium storing computer executable instructions that when executed by the at least one processor implement components comprising:
  - means for scheduling resources for an anchor carrier and a group of non-anchor uplink carriers;
  - means for transmitting an uplink grant on the anchor carrier that assigns resources for the group of non-anchor uplink carriers;
  - means for communicating with a recipient that utilizes the assigned resources to transmit uplink carrier transmissions on the group of non-anchor uplink carriers in accordance with the grant;
  - means for accessing a mapping of acknowledgements to multiple carriers;
  - means for transmitting an acknowledgement of receipt of the uplink carrier transmissions on the anchor carrier that sent the uplink grant; and
  - means for receiving retransmission of at least one of the uplink carrier transmissions if the at least one of the uplink carrier transmissions was not acknowledged as successfully received.

61. An apparatus for multiple carrier communication, comprising:
- a scheduler for scheduling resources for an anchor carrier and a group of non-anchor uplink carriers;
- a transmitter for transmitting a grant on the anchor carrier that assigns resources for the group of non-anchor uplink carriers; and
- a receiver for communicating with a recipient that utilizes the assigned resources on the group of non-anchor uplink carriers in accordance with the grant;
- accessing a mapping of acknowledgements to multiple carriers;
- transmitting an acknowledgement of receipt of the uplink carrier transmissions on the anchor carrier that sent the uplink grant; and
- receiving retransmission of at least one of the uplink carrier transmissions if the at least one of the uplink carrier transmissions was not acknowledged as successfully received.

62. The apparatus of claim 61, wherein the scheduler is further for determining common system information for acquiring at least one of the non-anchor uplink carriers; and
the transmitter is further for transmitting the common system information on the anchor carrier.

63. The apparatus of claim 61, wherein the scheduler is further for determining dedicated information for acquiring at least one of the non-anchor uplink carriers; and
the transmitter is further for transmitting the dedicated information on the anchor carrier.

64. The apparatus of claim 61, wherein the transmitter is further for transmitting one of a plurality of anchor carriers, each anchor carrier for assigning resources on a group of carriers.

65. The apparatus of claim 61, wherein the transmitter is further for transmitting a grant on a non-anchor carrier that assigns resources on the non-anchor carrier.

66. The apparatus of claim 65, wherein the scheduler is further for determining that no scheduling is necessary for non-anchor carriers; and
the transmitter is further for transmitting a non-anchor carrier that was previously transmitted as the anchor carrier.

67. The apparatus of claim 61, wherein the receiver is further for receiving an initiation of single carrier communication; and
the transmitter is further for transmitting a grant on the anchor carrier for a single carrier configured user equipment.

68. The apparatus of claim 67, wherein the transmitter is further for transmitting primary and secondary synchronization signals on the anchor carrier, for transmitting master information block on a Physical Broadcast Channel for identifying system bandwidth, Physical Hybrid Automatic Repeat Request Indicator Channel (PHICH) configuration, and system frame number, and transmitting system information blocks on downlink shared channel (DL-SCH) for resources on the anchor carrier.

69. The apparatus of claim 67, wherein the transmitter is further for transmitting the grant on the anchor carrier for the single carrier configured user equipment by transmitting a redirection message to another carrier by intra-cell inter-frequency handover.

70. The apparatus of claim 61, wherein the transmitter is further for transmitting system information blocks on the anchor carrier for utilizing at least one of the non-anchor uplink carriers comprising carrier location, carrier bandwidth, carrier uplink or downlink designation, carrier pairing, and a new control region.

71. The apparatus of claim 61, wherein the transmitter is further for transmitting the uplink grant on the anchor carrier with an implicit pairing to an uplink carrier.

72. The apparatus of claim 61, wherein the transmitter is further for transmitting the uplink grant on the anchor carrier with an explicitly identified uplink carrier.

73. The apparatus of claim 61, further comprising receiving channel quality indicator (CQI) feedback for multiple downlink carriers on an uplink anchor carrier.

74. The apparatus of claim 73, further comprising transmitting CQI feedback configuration by an additional system information block on the anchor carrier.

75. The apparatus of claim 73, further comprising transmitting CQI feedback configuration by resource radio control (RRC) signaling.

76. The apparatus of claim 61, further comprising:
- receiving channel quality indicator (CQI) feedback conveying interference jamming receipt of another carrier; and
- transmitting a grant assigning resources on a carrier not jammed by the interference.

77. The apparatus of claim 76, further comprising:
selecting an anchor carrier that does not interfere with a neighboring anchor carrier for multiple carrier reuse.

78. The apparatus of claim 77, further comprising adjusting transmit power of the anchor carrier to avoid interfering with the neighboring anchor carrier.

79. The apparatus of claim 77, further comprising requesting adjustment of transmit power of the neighboring anchor carrier by backhaul communication.

80. The apparatus of claim 76, further comprising:
- transmitting the anchor carrier that is being jammed by interference;
- transmitting another carrier comprising a non-anchor carrier; and
- transmitting a grant on the non-anchor carrier that assigns resources on the non-anchor carrier.

* * * * *